United States Patent
Nelson

(10) Patent No.: US 12,497,003 B2
(45) Date of Patent: Dec. 16, 2025

(54) POWER HEAD OR POWER ARM ASSEMBLY FOR LINEAR RECIPRICATION OF WINDSHIELD WIPER BLADE

(71) Applicant: NELSON AND NELSON ENTERPRISES, LLC, Salt Lake City, UT (US)

(72) Inventor: James Q Nelson, Salt Lake City, UT (US)

(73) Assignee: NELSON AND NELSON ENTERPRISES, LLC, Salt Lake City, UT (US)

( * ) Notice: Subject to any disclaimer, the term of this patent is extended or adjusted under 35 U.S.C. 154(b) by 303 days.

(21) Appl. No.: 17/768,102

(22) PCT Filed: Oct. 9, 2020

(86) PCT No.: PCT/US2020/055060
§ 371 (c)(1),
(2) Date: Apr. 11, 2022

(87) PCT Pub. No.: WO2021/072252
PCT Pub. Date: Apr. 15, 2021

(65) Prior Publication Data
US 2024/0083388 A1     Mar. 14, 2024

Related U.S. Application Data

(60) Provisional application No. 62/914,208, filed on Oct. 11, 2019, provisional application No. 62/985,199, filed on Mar. 4, 2020.

(51) Int. Cl.
*B60S 1/40*     (2006.01)
*B60R 16/027*     (2006.01)
(Continued)

(52) U.S. Cl.
CPC ............. *B60S 1/44* (2013.01); *B60R 16/027* (2013.01); *B60R 16/03* (2013.01); *B60S 1/0477* (2013.01); *B60S 1/40* (2013.01); *B60S 1/482* (2013.01)

(58) Field of Classification Search
CPC .... B60S 1/44; B60S 1/40; B60S 1/482; B60S 1/3402; B60S 1/0477; B60S 1/3801; B60S 2001/3813; B60R 16/027; B60R 16/03
See application file for complete search history.

(56) References Cited

U.S. PATENT DOCUMENTS

| 8,751,065 B1 | 6/2014 | Kato |
| 9,738,259 B2 | 8/2017 | Nelson |
| (Continued) | | |

FOREIGN PATENT DOCUMENTS

| DE | 102005013178 | 9/2006 |
| EP | 0210762 A1 | 2/1987 |
| (Continued) | | |

OTHER PUBLICATIONS

EP Search Report for application No. 20875589.2 dated Oct. 20, 2023.
(Continued)

*Primary Examiner* — Erin F Bergner
(74) *Attorney, Agent, or Firm* — Workman Nydegger

(57) ABSTRACT

A Power Head assembly includes a motor having a rotating shaft and a converter configured to convert rotational motion of the shaft to reciprocating linear motion. The Power Head assembly also includes a weatherproof housing configured to house the motor and an inner portion of the converter. The Power Head assembly also includes a receptacle configured to receive a windshield arm of the vehicle and a fastener configured to attach an outer portion of the converter to a windshield wiper blade directly or indirectly, causing the windshield wiper blade to reciprocate along the windshield (Continued)

wiper blade. The Power Head assembly also includes a controller control the motor of the Power Head assembly.

14 Claims, 19 Drawing Sheets

(51) Int. Cl.
*B60R 16/03* (2006.01)
*B60S 1/04* (2006.01)
*B60S 1/44* (2006.01)
*B60S 1/48* (2006.01)

(56) References Cited

U.S. PATENT DOCUMENTS

| | | | |
|---|---|---|---|
| 2003/0041900 A1* | 3/2003 | Wojan | B60S 1/481 |
| | | | 137/79 |
| 2007/0186366 A1 | 8/2007 | Alley | |
| 2013/0180545 A1* | 7/2013 | Nelson | B60S 1/08 |
| | | | 15/250.07 |
| 2016/0031419 A1 | 2/2016 | Nelson | |

FOREIGN PATENT DOCUMENTS

| | | |
|---|---|---|
| EP | 0786386 | 7/1997 |
| EP | 1736386 | 3/2006 |
| WO | 2017023221 | 2/2017 |

OTHER PUBLICATIONS

International Search Report and Written Opinion for PCT/US2020/055060 mailed Jan. 5, 2021.

* cited by examiner

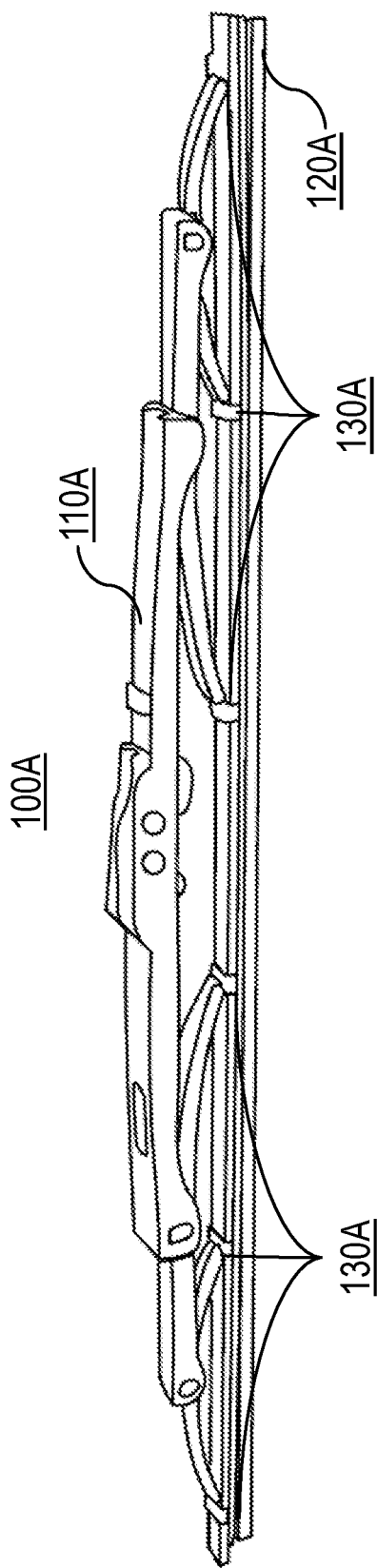
Fig. 1A
Fig. 1B

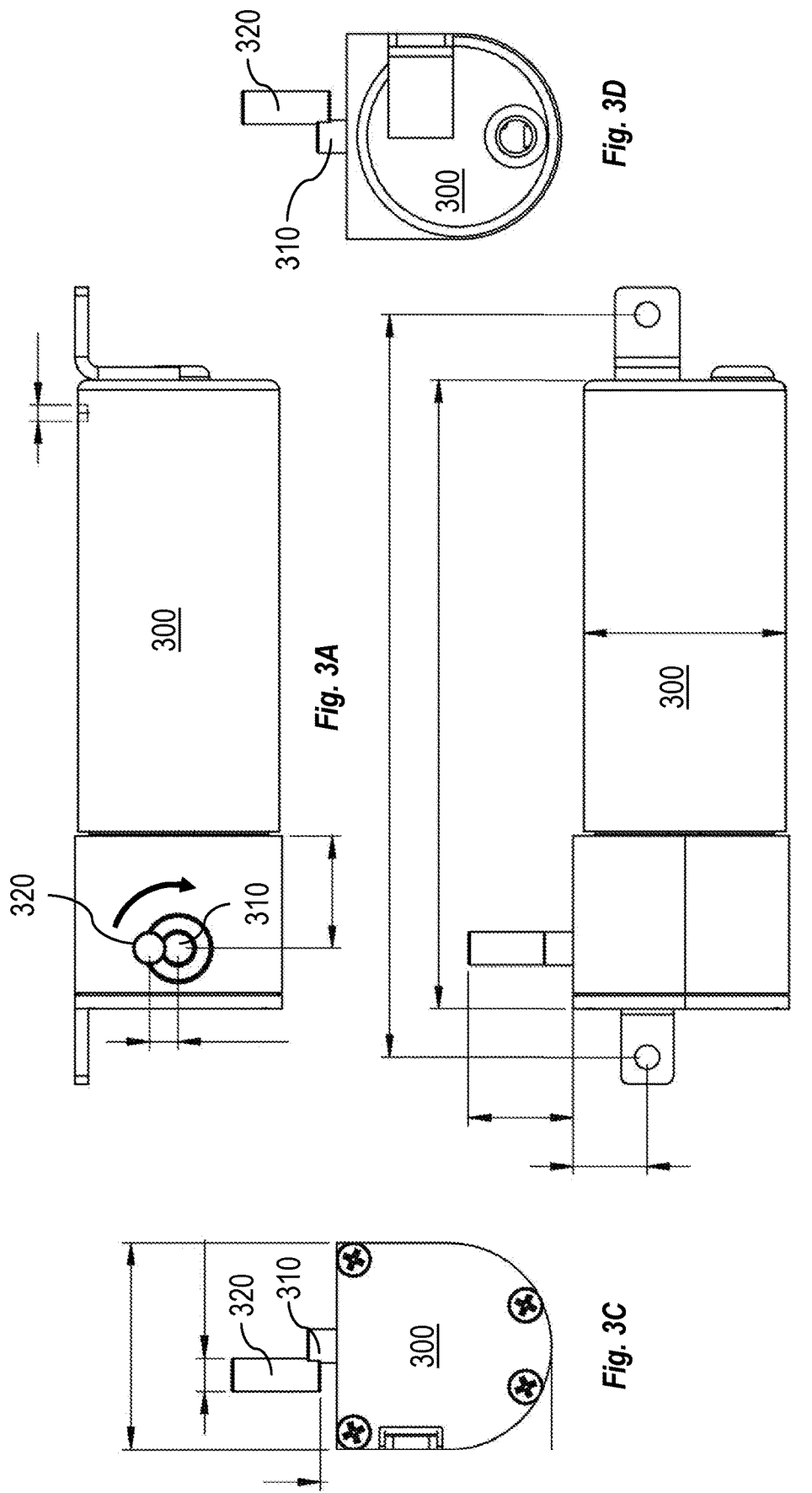

POWER HEAD OR POWER ARM ASSEMBLY FOR LINEAR RECIPRICATION OF WINDSHIELD WIPER BLADE

CROSS-REFERENCE TO RELATED APPLICATIONS

This application is a 35 U.S.C. § 371 U.S. nationalization of PCT Application No. PCT/US2020/055060, filed Oct. 9, 2020, which claims priority to U.S. Provisional Application Ser. No. 62/914,208, filed on Oct. 11, 2019 and entitled "POWER HEAD," and U.S. Provisional Application Ser. No. 62/985,199, filed on Mar. 4, 2020 and entitled "POWER ARM FOR WINDSHIELD WIPER," wherein all of the foregoing are incorporated herein by reference in their entireties.

BACKGROUND

A windshield wiper is a device used to remove rain, snow ice, washer fluid, water, and/or debris from a vehicle's windshield so the vehicle's operator can better see what's ahead of them. Almost all motor vehicles, including cars, trucks, buses, train locomotives, and watercraft, and some aircraft, are equipped with one or more such windshield wipers. A windshield wiper generally includes an arm, one end of which pivots, and the other end of which has a long rubber blade attached to it. The arm rotates about the pivot point across the windshield, pushing water, other precipitation, or some other impediments to visibility, from its surface.

However, insects, ice, and/or other debris may hit and adhere to the windshields, some of which cannot be easily cleaned off merely using windshield wipers. Drivers may need to go to car cleaning services or manually scrub the windshields to remove such insects, ice, and/or other debris.

Additionally, snowplows or other special vehicles are often required to operate in extreme weather conditions. For example, snow and ice may build up on the windshields of snowplow vehicles. The results, with conventional or beam type windshield wipers, the wiper, wiper arm hinge and the support structure freezes. Electrically heated wiper blades, wiper arm hinge and the support structure freezes. In both cases the wiper are rendered ineffectual.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a Power Head assembly configured to cause a windshield wiper blade of a vehicle to reciprocate linearly along the windshield wiper blades longitudinal axis, 90 degrees perpendicular in relation to the arc of the wiper sweep. The multi-directional motion allowing for better removing ice or debris from a windshield of the vehicle. The Power Head assembly includes a motor (later referred to as a first motor) having a rotating shaft (later referred to as a first shaft) and a converter (later referred to as a first converter) coupled to the rotating shaft. driven by the rotating shaft. The converter is configured to convert rotational motion of the shaft to reciprocating linear motion. In some embodiments, the Power Head assembly further includes a weatherproof housing configured to cover the motor and at least an inner portion of the converter.

The Power Head assembly also includes a receptacle (later referred to as a first receptacle) configured to receive a windshield arm (later referred to as a first windshield arm) of the vehicle, and a fastener (later referred to as a first fastener) configured to attach the converter to a windshield wiper blade (later referred to as a first windshield wiper blade) directly or indirectly. When the converter is attached to the windshield wiper blade, and the motor is activated, the windshield wiper blade is caused to reciprocate along the longitudinal axis of the windshield wiper, 90 degrees in relation to the arc of the wiper sweep. The Power Head assembly also includes a controller configured to automatically or manually control the motor. The controller includes one or more input power lead connectors and one or more output power lead connectors. The input power lead connectors are configured to connect to an electrical system of the vehicle (e.g., battery of the vehicle or any power source of the correct voltage) for receiving power from the electrical system of the vehicle. The output power lead connectors are configured to connect to the motor to supply the power received from the electrical system of the vehicle to the motor. The controller also includes a control circuit configured to generate a control signal (also referred to as a first control signal) for controlling the power supplied to the motor.

In some embodiments, the controller further includes an interface configured to receive a user input to activate or deactivate the control circuit. In some embodiments, the interface is a wireless interface configured to receive wireless signals of user input. In some embodiments, the controller further includes a remote control configured to receive a user input, convert the user input into a wireless signal, and transmit the wireless signal to the wireless interface. Alternatively, or in addition, the wireless interface includes a Bluetooth interface configured to communicate with a mobile device via Bluetooth connections. A user may download an application associated with the controller onto the mobile device, and use the application to control the motor of the Power Head remotely or wirelessly.

In some embodiments, the control signal includes a pulse control signal that has one or more predetermined patterns that automatically turns the supplied power on or off at one of the one or more predetermined patterns. In some embodiments, the interface is configured to receive a user input of selecting one of the one or more predetermined patterns. In response to receiving the user input of selecting one of the one or more predetermined patterns, the pulse control circuit causes the pulse control signal to have the selected pattern that automatically turns the supplied power on or off at the selected pattern.

In some embodiments, each of the one or more predetermined patterns includes a pulse length, indicating a length of period during which the power supplied to the motor is turned on, and a pulse delay, indicating a length of period during which the power supplied to the motor is turned off. The interface is configured to receive a first user input of selecting one of a plurality of pulse lengths and a second user input of selecting one of a plurality of pulse delays.

In some embodiments, the controller may be controlled by washer fluid. For example, in some embodiments, the controller includes a fluid connector configured to connect to washer fluid from a fluid hose coupled to a windshield fluid pump of the vehicle. The controller further includes a fluid sensor configured to detect a pressure of the washer fluid. When the windshield fluid pump is activated, the fluid sensor detects a pressure increase (or the pressure is greater than a predetermined threshold), causing the controller to activate the motor; and when the windshield fluid pump is deactivated, the fluid sensor detects a pressure decrease (or the pressure is lower than the predetermined threshold), causing the controller to deactivate the motor.

In some embodiments, the controller further includes a protective circuit. The protective circuit includes a current sensor configured to detect a current flowing through the motor. When the current flowing through the motor is greater than a threshold, the controller cuts off the power of the motor for a predetermined period. In some embodiments, the protective circuit further includes a countdown timer. The predetermined period is measured by the countdown timer counting down from a predetermined number at a predetermined time interval. When the countdown timer reaches zero count, the controller reconnects the power to the motor.

In some embodiments, the Power Head assembly further includes a second motor, a second receptacle, and a second fastener. The second motor has a second shaft configured to rotate when the second motor is activated. The second converter is coupled to the second shaft and configured to convert rotational motion of the second shaft to reciprocating linear motion. The second receptacle is configured to receive a second windshield arm of the vehicle, and the second fastener is coupled to the second converter configured to fasten the second converter onto a second windshield wiper blade directly or indirectly, causing the second windshield wiper blade to reciprocate along the second windshield wiper blade when the second motor is activated. The controller further includes one or more second output power lead connectors configured to connect the second motor to supply power received from the electrical system of the vehicle to the second motor. The control circuit is further configured to use the control signal to control power supplied to the second motor.

In some embodiments, the controller further includes a second protective circuit for the second motor, as such each motor is independently protected by its own protective circuit. For example, a first protective circuit includes a first current sensor configured to detect a current flowing through the first motor, and a second protective circuit includes a second current sensor configured to detect a current flowing through the second motor. When the current flowing through the first motor or the second motor is greater than a predetermined threshold, the controller shuts down the power supplied to the corresponding motor for at least a predetermined period. For example, when the current flowing through the first motor is greater than the predetermined threshold, and the current flowing through the second motor is not greater than the predetermined threshold, the controller only shuts down the power of the first motor for at least the predetermined period, and continues to supply the power to the second motor while the first motor is shut down.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, amore particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 1A illustrates a conventional windshield wiper blade;

FIG. 1B illustrates a beam windshield wiper blade;

FIGS. 3A through 3D illustrate an example embodiment of a motor in a Power Head assembly;

DETAILED DESCRIPTION

The embodiments described herein are related to a Power Head assembly configured to be coupled to a windshield wiper blade of a vehicle to cause the windshield wiper blade to reciprocate 90 degrees perpendicular to the wiper sweep pattern for better removing ice or debris from a windshield of the vehicle.

There are various types of windshield wiper blades. The principles described herein can be implemented with any type of windshield wiper blades. FIGS. 1A and 1B illustrate two example types of windshield wiper blades. FIG. 1A illustrates an example of conventional windshield wiper blade 100A that often has a metal frame 110A and a blade 120A snapped into several contact points 130A on the metal frame 110A. FIG. 2B illustrates an example beam windshield wiper blade 100B that does not have a rigid frame, such that the beam windshield wiper blade 100B can be more curved than the conventional ones to fit different contours of the windshield.

Figure 2A:
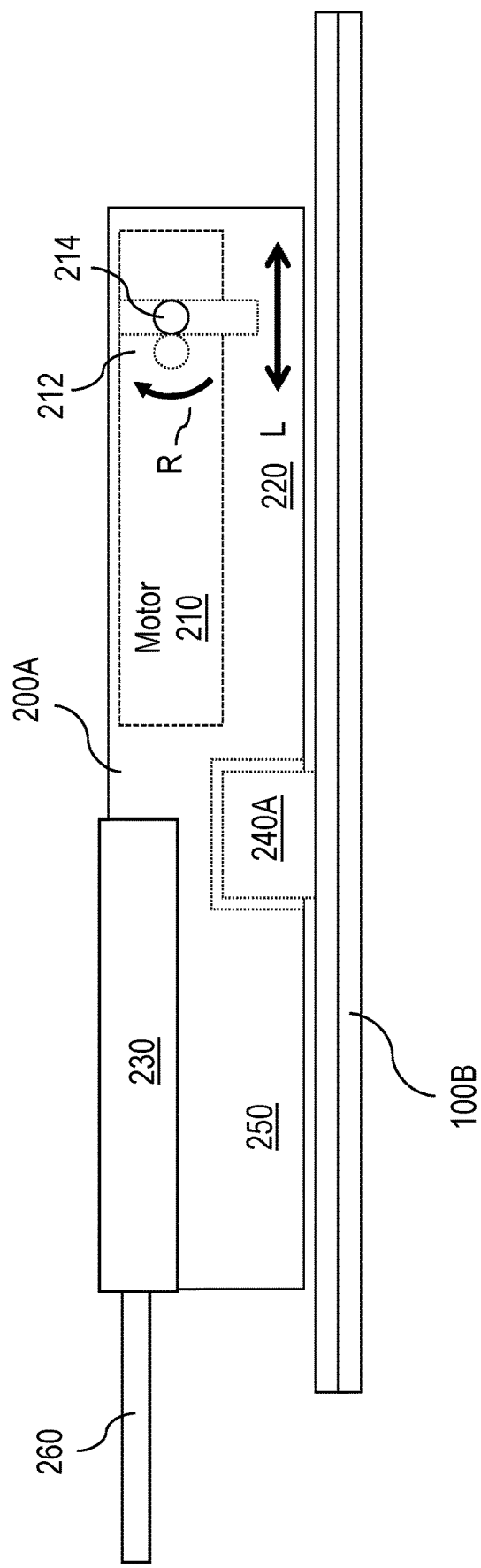
FIG. 2A illustrates an example Power Head assembly installed on a beam windshield wiper blade.
Figure 2B:
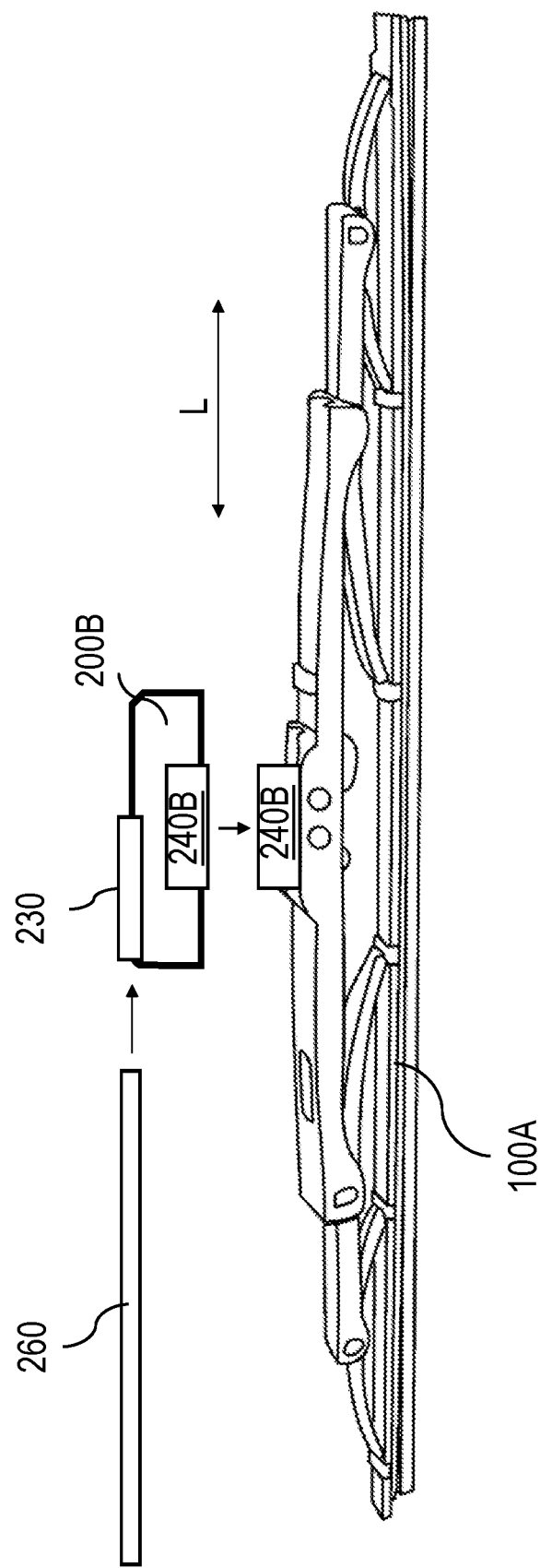
FIG. 2B illustrates an example Power Head assembly configured to be installed on a conventional windshield wiper blade.

FIG. 2A illustrates an example embodiment of a Power Head assembly 200A that is attached to a beam windshield wiper blade 100B. As illustrated in FIG. 2A, the Power Head assembly 200A includes a motor 210 that has a rotating shaft 212 coupled to a cam 214 configured to rotate in the direction R. The Power Head assembly 200A also includes a converter 220 configured to convert the rotational motion of the shaft 212 or the cam 214 to reciprocating linear motion in the direction L. A weatherproof housing 250 is configured to cover the motor 210 and an inner portion of the converter 220.

Further, the Power Head assembly 200A also includes a receptacle 230 configured to receive a wiper arm 260 of a vehicle (not shown) and a fastener 240A configured to fasten an outer portion of the converter 220 onto the beam windshield wiper blade 100B directly or indirectly. In some embodiments, the fastener 240A may include a pair of pieces, one of which is configured to be attached to the beam windshield wiper blade 100B, and the other one of which is configured to be attached to the outer portion of the converter 220.

Similarly, in some embodiments, a Power Head assembly is also configured to be attached to a conventional windshield wiper blade 100A. FIG. 2B illustrates an example embodiment of the Power Head assembly 200B that is configured to be attached to the conventional windshield wiper blade 100A. As illustrated in FIG. 2B, the Power Head assembly 200B also includes a receptacle 230 configured to receive a windshield arm 260 and a fastener 240B. The fastener 240B includes a pair of pieces, one of which is configured to be attached to the frame of the conventional windshield wiper blade 100A, and the other one of which is configured to be attached to the Power Head assembly 200B. The pair of the pieces 240B are configured to be coupled to each other to attach the Power Head assembly 200B and the windshield wiper blade 100A together.

The Power Head assemblies 200A and 200B may have substantially similar structures, except using different fasteners 240A and 240B configured to fasten the Power Head assembly 200A or 200B onto different types of windshield wiper blades 100B or 100A. When the motor of the Power Head assembly 200A or 200B is fastened onto a windshield wiper blade 100B or 100A, and the motor 210 is activated, the converter 220 causes the windshield wiper blade 100B or 100A to reciprocate in the direction L along the windshield wiper blade 100B or 100A, i.e., reciprocate in a direction that is parallel to the wiper blade of the windshield wiper blade 100B or 100A.

Figure 2C:
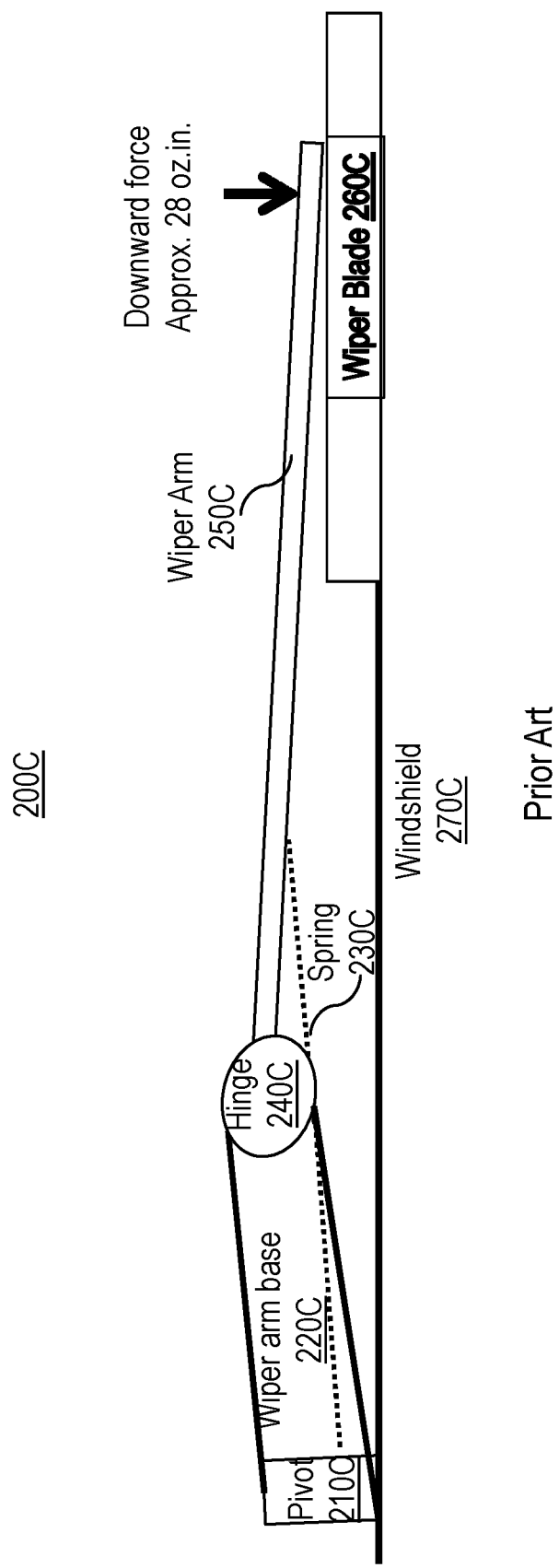
FIG. 2C illustrates an example of a conventional wiper arm assembly.

In some embodiments, the principles described herein may also be implemented on a windshield arm assembly of a vehicle (hereinafter also referred to as a Power Arm assembly). FIG. 2C illustrates an example of a conventional wiper arm assembly 200C. The example conventional wiper arm assembly 200C includes a motorized drive pivot 210C, a wiper arm base 220C, a hinge 240C, a spring 230C, and a wiper arm 250C configured to receive a wiper blade 260C. The wiper arm base 220C is attached to the motorized drive pivot 210C and held rigidly by the pivot 210C. The hinge 240C is placed between a wiper arm 250C and the wiper arm base 220C to allow the wiper arm 250 to move up and down. The spring 230C is anchored between the wiper arm base 220C and the wiper arm 250C. A wiper blade 260C is removably attached to the wiper arm 250C. The lengths and weights of the wiper arm 250C and the wiper blade 260C generate a tension force on the spring 230C, which, in turn, generates a downward force on the wiper blade 260C, such that the wiper blade 260C is able to act as a squeegee for cleaning a corresponding windshield 270C.

Figure 2D:
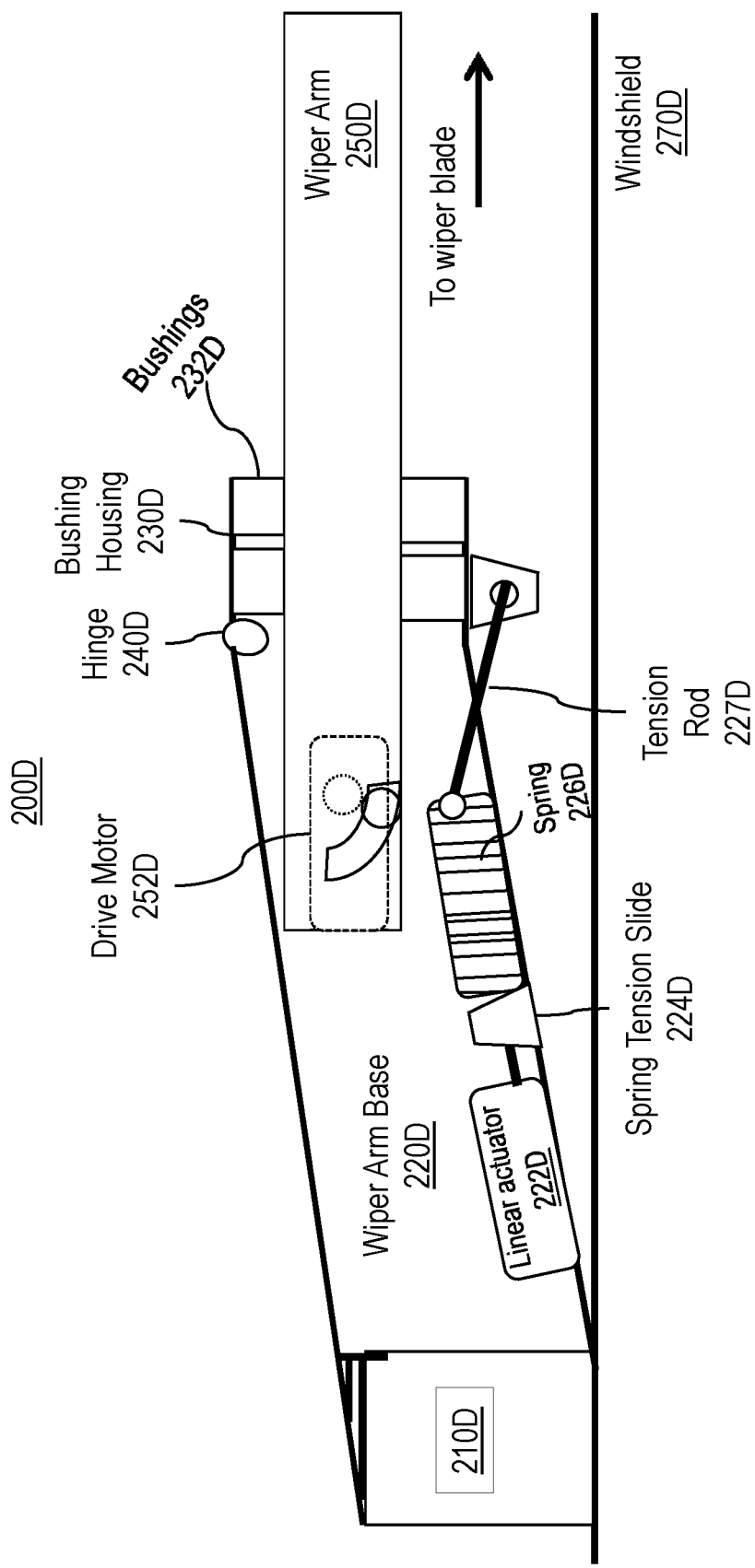
FIGS. 2D and 2E illustrate an example Power Arm assembly configured to be switched between an operating position and an off position.
Figure 2E:
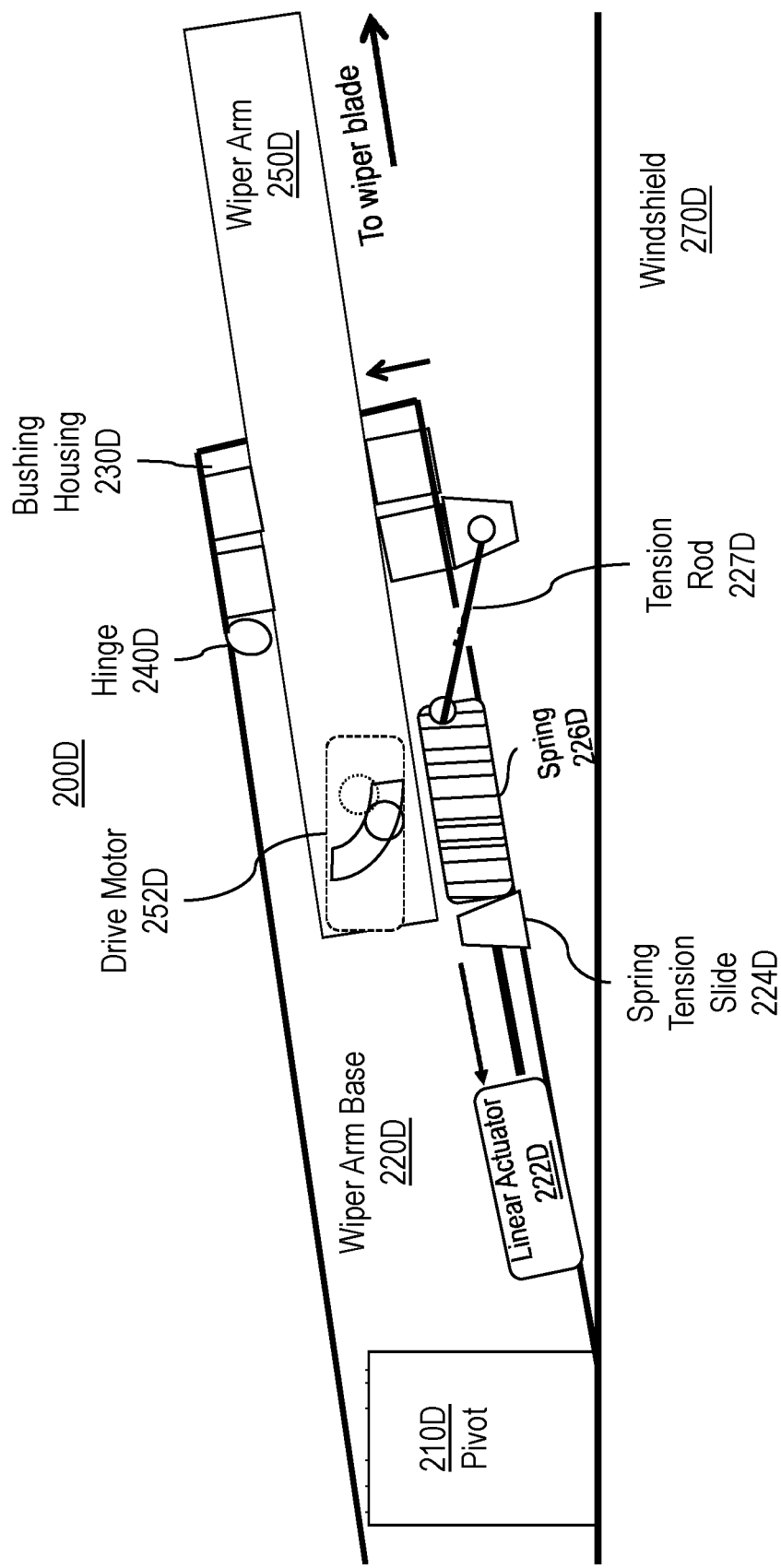

FIGS. 2D and 2E illustrate an example embodiment of a Power Arm assembly 200D that embodies the principles described herein. The Power Arm assembly 200D includes a factory motorized pivot 210D, a wiper arm base 220D, and a power wiper arm 250D. The power wiper arm 250D includes a drive motor 252D configured to cause the power wiper arm 250D to reciprocate along the power wiper arm 250D. In some embodiments, the drive motor 252D may include a rotary motor and a converter, which is configured to convert the rotational motion of the rotary motor to linear reciprocal motion, similar to the motor 210 and converter 220 of Power Head 200A.

In some embodiments, the wiper arm base 220D not only includes a hinge 240D, but also includes a switching mechanism to switch the power wiper arm 250D between an operating position and an off position. FIG. 2D illustrates that the power wiper arm 250D is in an operating position. When the power wiper arm 250D is in the operating position, a wiper blade (not shown) attached on the power wiper arm 250D touches the windshield 270D and applies pressure onto the windshield 270D for cleaning the windshield. FIG. 2D illustrates that the power wiper arm 250D is in an off position. When the power wiper arm 250D is in the off position, the wiper blade (not shown) attached to the power wiper arm 250D is off the windshield 270D. In some embodiments, when the vehicle is shut off, the switching mechanism automatically switches the power wiper arm 250D to the off position. Alternatively, or in addition, a user can manually switch the switching mechanism to cause the power wiper arm 250D to be manually placed in the operating position or the off position.

Different mechanical components may be implemented in the switching mechanism for switching the power wiper arm 250D. In some embodiments, the switching mechanism includes a linear actuator 222D, a spring tension slide 224D, a spring 226D, a tension rod 227D, a bushing housing 230D, and one or more bushings 232D. The hinge 240D connects the wiper arm base 220D and the bushing housing 230D, such that the bushing housing 230D is capable of rotating along the hinge 240D. The one or more bushings 232D are configured to protect the component housed in the wiper arm base 220D, including (but are not limited to) the drive motor 252D. The one or more bushings 232D may be made from various materials. In some embodiments, the one or more bushings 232D are made from POM-C.

The linear actuator 222D is configured to actuate the spring tension slide 224D, which in turn pushes or pulls the spring 226D along the wiper arm base 220D. The tension rod 227D connects the spring 226D and the bushing housing 230D. As illustrated in FIG. 2D, when the linear actuator 222D pulls the spring tension slide 224D away from the spring 226D, the spring 226D is stretched to generate a first tension force pulling the tension rod, which in turn pulls the bushing house 230D to hinge downward. As such, the bushing house 230D having the bushings 232D holds the power wiper arm 250D in the operating position. When the power wiper arm 250D is in an operating position, the power wiper arm 250D generates a downward pressure, which is passed on to the wiper blade (not shown) for pressing the windshield 270D. In some embodiments, the downward pressure generated by the power wiper arm 250D during the operating position is similar to the downward pressure generated by the conventional wiper arm assembly 200C, e.g., approximately 28 oz./inch.

Similarly, the switching mechanism is also capable of switching the power wiper arm 250D to the off position. As illustrated in FIG. 2E, when the linear actuator 222D pushes the spring tension slide 224D toward the spring 226D, the spring 226D is compressed to generate a second tension force, which pushes the tension rod 227D. The tension rod 227D then pushes the bushing housing 230D away from the windshield 270D. The wiper arm 250, in turn, raises the wiper blade (not shown) off the windshield 270D.

Figure 2F:
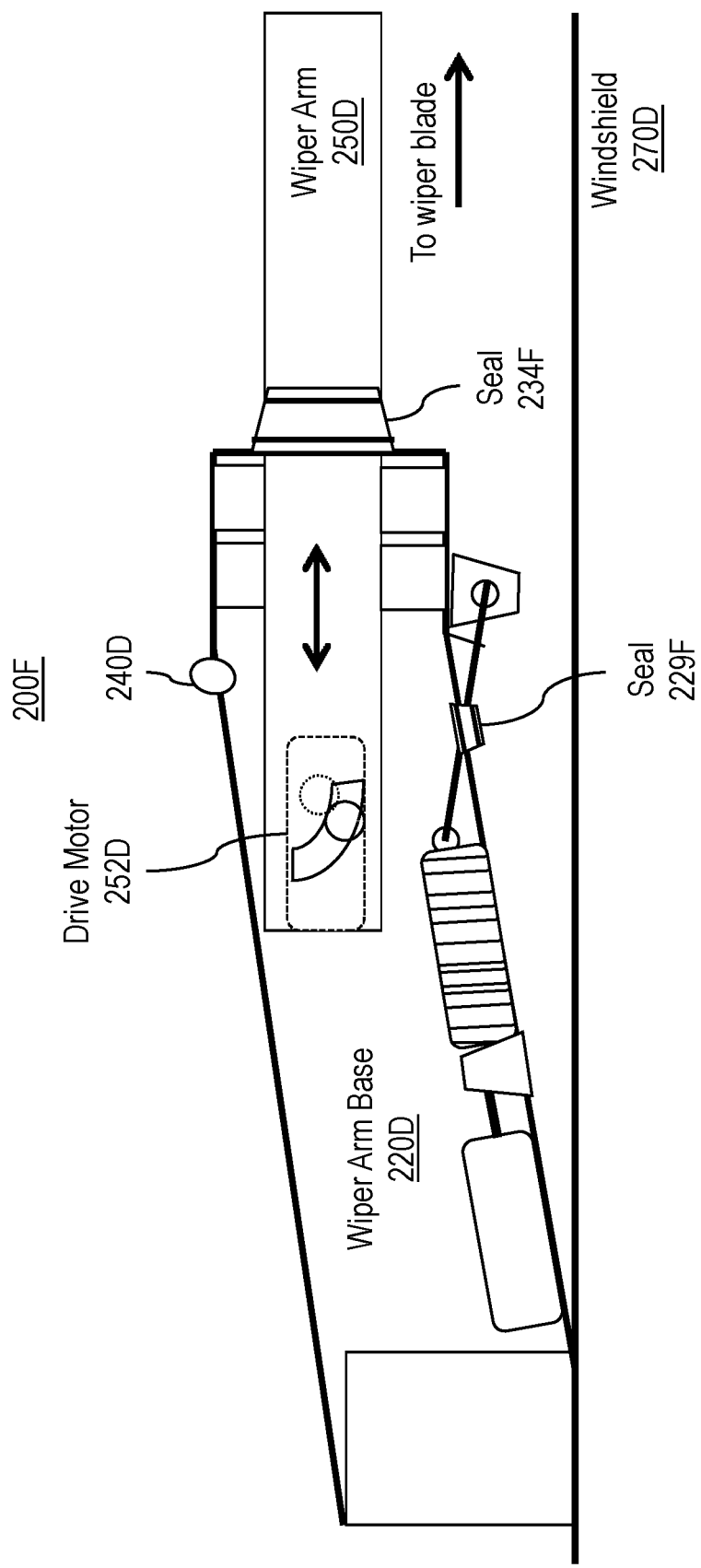
FIG. 2F illustrates another example embodiment of Power Arm assembly, including a seal configured to protect a drive motor and other mechanisms housed inside a wiper arm base.

FIG. 2F illustrates another example embodiment of Power Arm assembly 200F, including a seal 234F configured to further protect the drive motor 252D and other mechanism housed inside the wiper arm base 220D from water or weather. In some embodiments, a seal 229F is also provided to protect the tension rod 227D. The seals 234F and 229F may be made from various materials. In some embodiments, the seal 234F or 229F is an accordion-type seal. In some embodiments, the seal 234F or 229F is IP-68 waterproof.

Figure 2G:
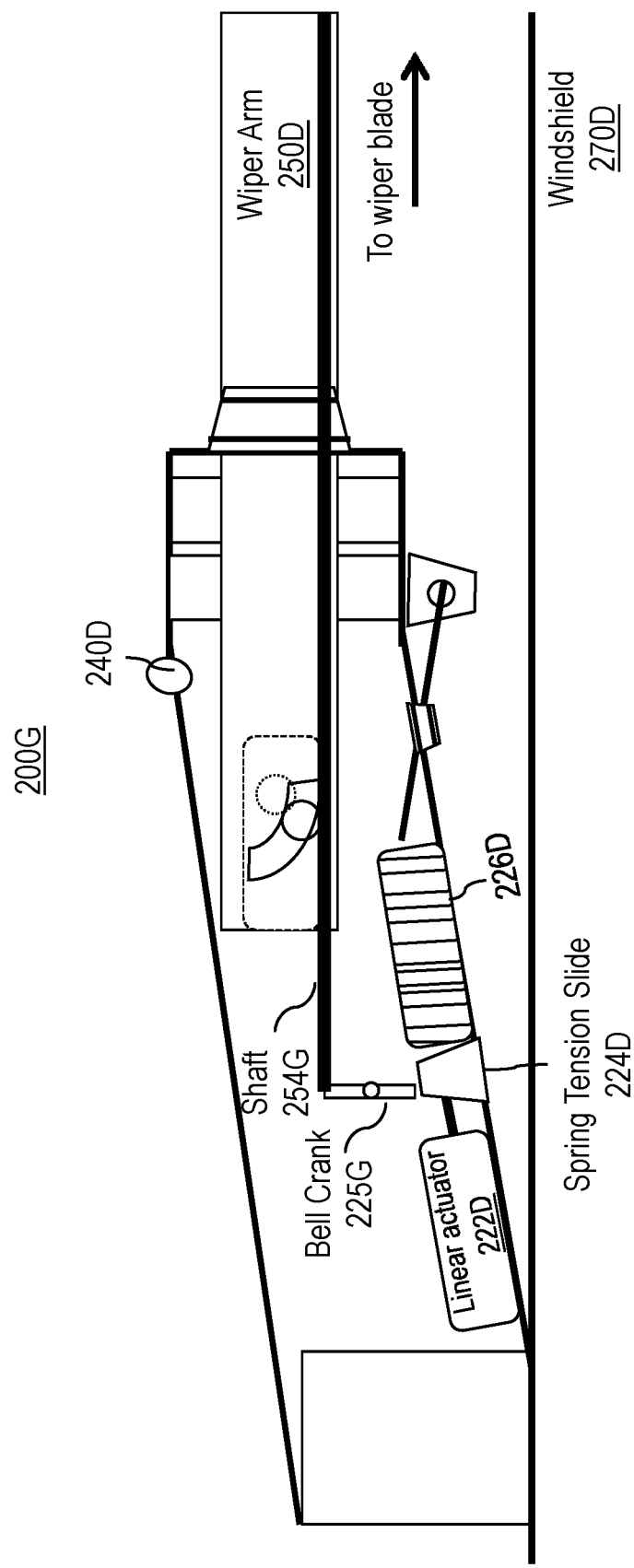
FIGS. 2G and 2H illustrate yet another example embodiment of Power Arm assembly, including a bell crank and a shaft for supporting the wiper arm in different positions.
Figure 2H:
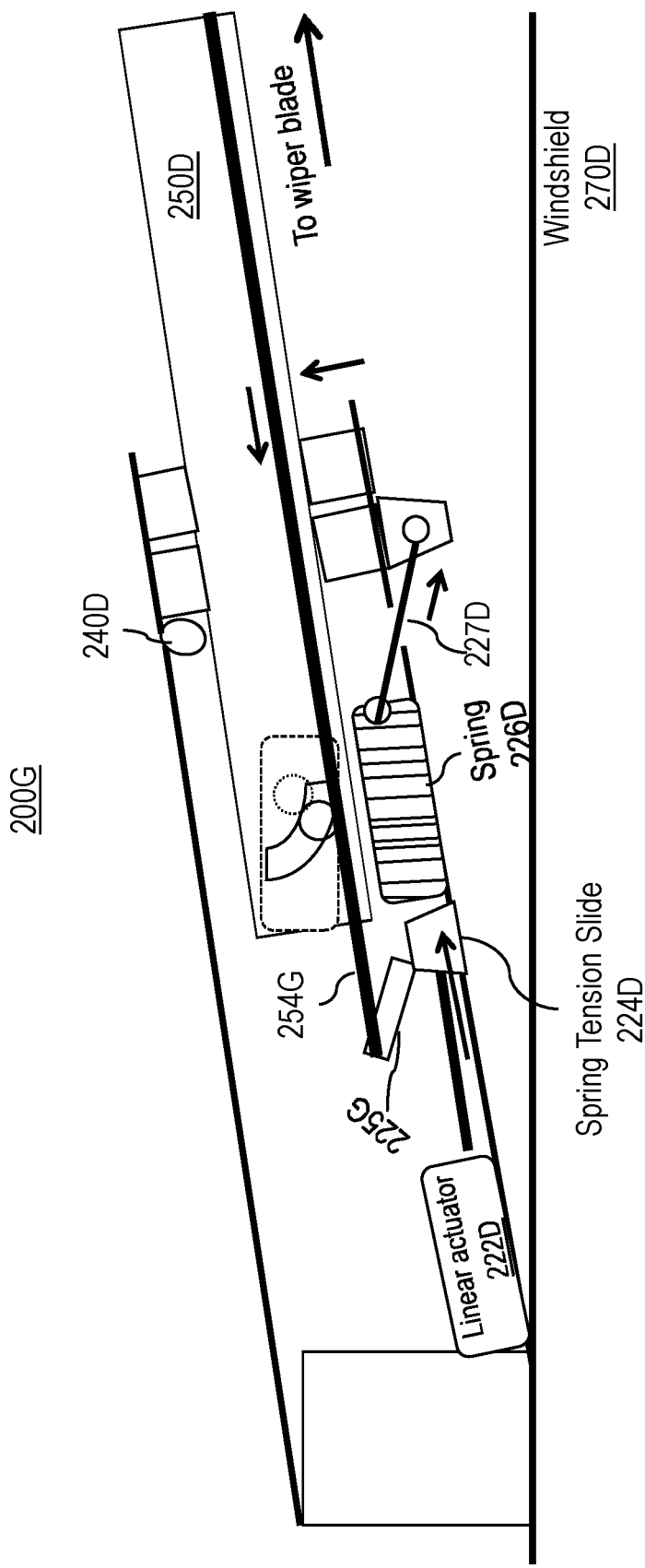

FIGS. 2G and 2H illustrate yet another example embodiment of Power Arm assembly 200G, including a bell crank 225G and a shaft 254G for supporting the power wiper arm 250D in different positions. As illustrated in FIGS. 2G and 2H, the power wiper arm 250D further includes a shaft 254G protruding into the wiper arm base 220D. The bell crank 225G rotatably connects the spring tension slide 224D and an end of the shaft 254G, such that when the power wiper arm 250D is in the operating position, the bell crank 225G is substantially vertical relative to the shaft 254G to help the tension rod 227D to push the power wiper arm 250D downward as illustrated in FIG. 2G. Further, as illustrated in FIG. 2H, when the power wiper arm 250D is in the off position, the bell crank 225G is positioned at an angle from the shaft 254G to help the tension rod 227D to lift the power wiper arm 250D up.

Figure 2I:
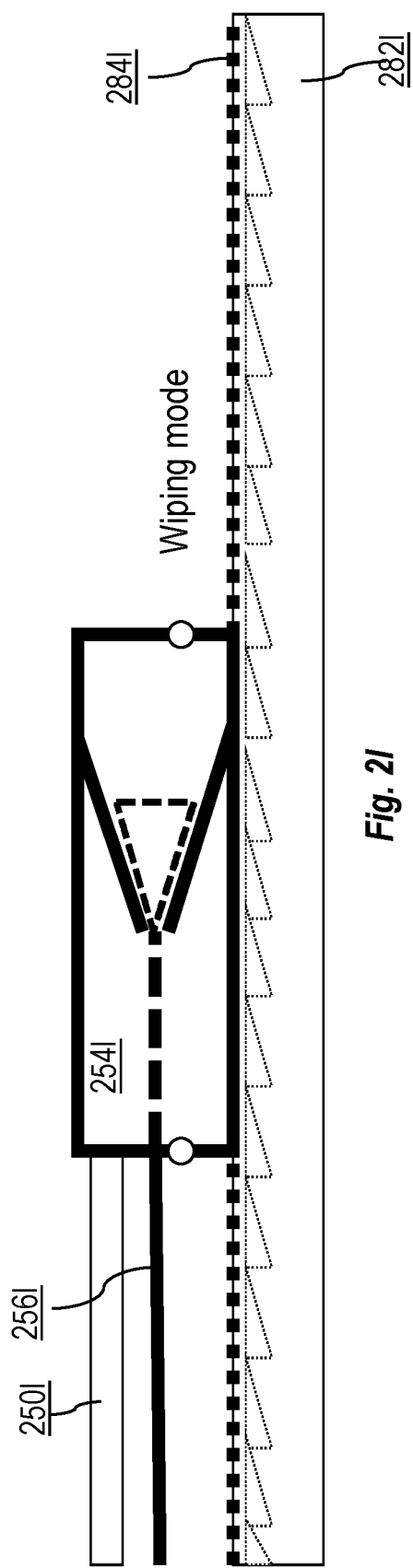
FIGS. 2I and 2J illustrate an example embodiment of a Power Arm assembly configured to receive a wiper blade and a scraper.
Figure 2J:
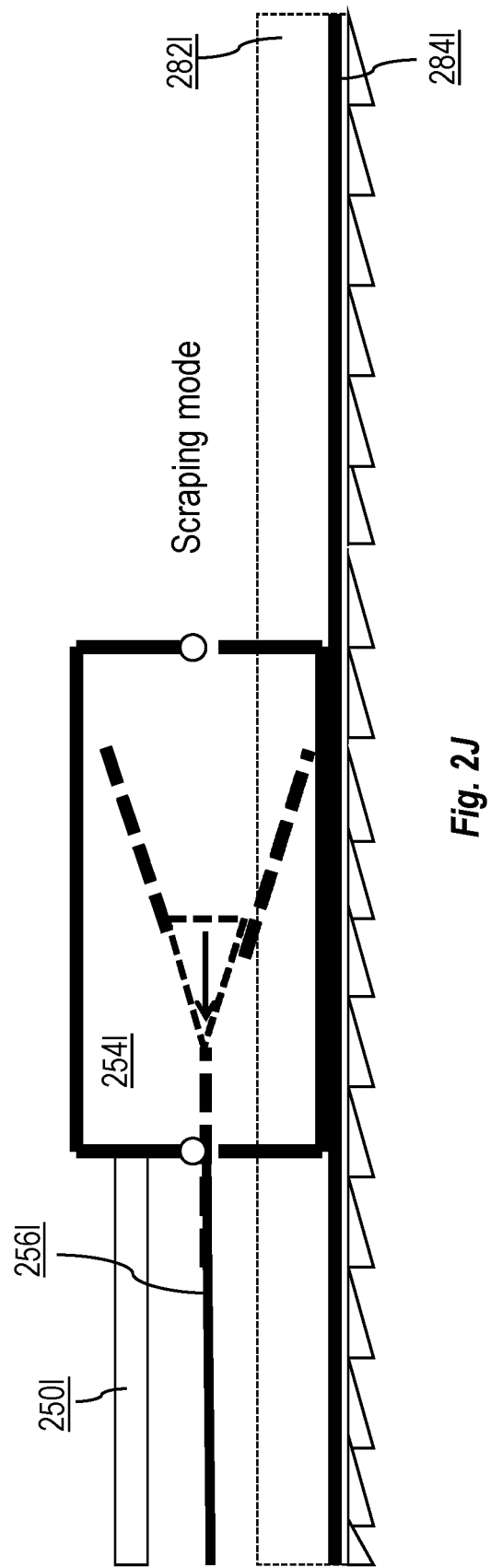

In some embodiments, the Power Arm assembly is not only configured to receive a conventional or beam wiper, but also configured to receive a scraper. FIGS. 2I and 2J further illustrate an example embodiments of the wiper arm 250I of a Power Arm assembly, which may correspond to the power wiper arm 250D of the Power Arm assembly 200D, 200F, and/or 200G of FIGS. 2D through 2H.

As illustrated in FIGS. 2I and 2J, the Power Arm 250I is configured to receive both a wiper blade 282I and a scraper 284I. The wiper blade 282I may be a conventional or a beam wiper blade configured to act as a squeegee to wipe clean the windshield. The scraper 284I may include a serrated blade configured to scrape the snow or ice off the windshield. In some embodiments, the Power Arm 250I includes a switching mechanism configured to switch the Power Arm 250I between a wiping mode and a scraping mode. FIG. 2I illustrates that the wiper arm 250I is in the wipe mode, in which the scraper 284I is retracted. FIG. 2J illustrates that the wiper arm 250I is in the scraping mode, in which the scraper 284I is lowered below the wiper blade 282I to be in contact with the windshield.

In some embodiments, the switching mechanism includes an actuator 254I configured to move the scraper 284I up and down relevant to the windshield. In some embodiments, the actuator 254I is coupled to a control cable 256I. When the control cable 256I is tightened, the scraper 284I is lowered to the scraping mode as illustrated in FIG. 2I, and when the control cable 256I is released, the scraper 284I is retracted to the wipe mode as illustrated in FIG. 2J.

Note, the motor 210 and/or any motive power for any mechanical function in the Power Head or the Power Arm could be supplied by electric, hydraulic, and/or pneumatic force sources.

One of the advantages of the Power Arm is to ensure that the downward pressure remains constant or variable regardless of conditions while combining the features of the power wiper. Many drivers have experienced wind lift from the wipers, which is a major problem for vehicles that need to operate in storms. The Power Arm is configured to use a controller to receive and process negative feedbacks to stabilize the wiper blades in any whether condition (especially when high wind lift is present).

Various sensors may be implemented to provide such negative feedbacks to the controller. In some embodiments, a pressure sensor is implemented to directly sense the pressure from the wiper arm to the blade contact. Alternatively, or in addition, a current sensor is implemented to measure the load (current draw) of the reciprocating motor or the linear actuator, Alternatively, or in addition, a laser or sonic sensor is implemented to measure a distance to the glass of the windshield, sonically. In some other embodiments, a degree encoder (e.g., a ⅒ to 5/10 degree encoder) may be built into the hinge 240D to supply the controller with information.

In some embodiments, the detected up and down stop position for the Power Arm may also cause the controller to generate a notification to the driver or automatically adjust the Power Arm. For example, when the scraper had descended through the ice to the windshield, the controller would retract the scraper and prepare to run the rubber wiping blade. In some embodiments, the controller's function is proactive, and its function is always on when the system is active. In such a case, the sensor(s) are configured to constantly measuring the status and/or position of the Power Arm and the pressure exerted on the wiper rubber blade, which causes the controller to constantly adjust the variables of the Power Arm. As such, dangerous condition of windshield wiper caused by wind lift can be eliminated.

For example, in some embodiments, the operating downward pressure for most conditions would be the standard of about 28 oz.in. (which is used for passenger vehicles). In some embodiments, the controller can be programmed to actively maintain wiper arm downward pressure when needed. It may be activated by the driver or based on an algorithmic program directly or indirectly sensing the current downward pressure. In some embodiments, the downward force may be indicated based on a number of times per period that the Power Arm reciprocates. For example, when the number of times is low, it is likely that the downward force is high, and vice versa. The controller is configured to count a number of times per period that the Power Arm reciprocates. In some embodiments, the controller is further configured to average the numbers of times per period that the Power Arm reciprocates in a predetermined number of periods. The downward force could also be crudely measured by the current flowing to the sweep motor. When the times per period are fewer than a predetermined minimum threshold (and/or when the current flowing to the sweep motor is greater than a predetermined minimum threshold), the controller adjusts the downward force of the Power Arm by automatically retracting the spring tension slide towards the wiper arm pivot, and/or vice versa.

In some embodiments, some of the controller functions or features could be activated by an operation of a control panel or an operation of another function or feature. For example, in some embodiments, a countdown feature may be used exclusively when the windshield washing function is activated. As another example, in some embodiments, when the driver activates the countdown feature, the downward force is increased by a predetermined percentage (e.g., 50%) for the wash cycle. This would substantially increase the speed and efficiency of the Power Wiper/Head/Arms ability to clean insects. In yet another example, the effect on ice/snow would be the same but activated by a different or stand alone function.

In some embodiments, the Power Arm has a predetermined minimum operating temperature. For example, when the entire operating mechanism is located in the wiper base with sealed openings to accommodate IP-68 standards, the minimum operating temperature may be set by the gelling temperature of the synthetic grease in the 90-degree gearbox (e.g., −35 F). In some embodiments, when the temperature is lower than the predetermined minimum temperature, the controller refrains from starting the Power Arm.

In some embodiments, a heating element is coupled to the Power Arm, and the heating element is configured to preheat the base of the Power Arm to −35 F. In such a case, the minimum operating temperature would be eliminated, and the Power Arm is capable of operating in any temperature environment.

In some embodiments, the controller may operate at about 8 MHz so that the current load in the present Power Wiper system motors may be measured up to 8 million times a second. Different modifications of software modules of the controller can control all functions described herein, and all these functions can also be controlled via a Bluetooth or any other wireless and/or wired connections.

Additionally, in some embodiments, the Power Head or the Power Arm may further include a global positioning system (GPS) and a wireless communication system (e.g., BLE, WiFi, satellite, 2G, 3G, and/or 4G wireless system). The GPS and/or WiFi communication system(s) are configured to obtain a current location, a speed, and/or an acceleration of the Power Head or the Power Arm, which are also the location, the speed, and/or the acceleration of the vehicle. The wireless communication system(s) may also be configured to report the data obtained by the GPS system, the wireless communication system, and/or other sensors (e.g., a thermometer, the sonic/laser sensor of the power arm, etc.) and/or the settings of the Power Head or the Power Arm to a user's mobile device and/or remote server in real time. The location data, speed, and/or acceleration data may be used to access the safety of drivers. The location data, sensors data, and settings of the Power Head or Power Arm can be analyzed and transformed by the remote server to identify current weather conditions or road conditions at different locations where Power Heads or Power Arms are operating.

In some embodiments, a mobile application or computer application may be installed at any mobile device or computing device to receive the location data, motion data, sensors data, and settings of the Power Head or Power Arm from the Power Head or Power Arm directly via BLE, NFC, Wi-Fi direct, etc. In some embodiments, the mobile application may also be configured to analyze the received raw data to identify the driver's safety and the road conditions, and/or send the raw data and/or analyzed data to a remote server. In some embodiments, the mobile application may also be configured to visualize the received raw data and/or analyzed results, and automatically generate alert and/or notifications to the user.

In some embodiments, the remote server is further configured to broadcast or post the received and/or analyzed weather conditions and road conditions publicly or within a group of devices, such that professional drivers and supervisors could see who needed help, and traffic could also be routed or rerouted based on real time weather and/or road conditions.

FIGS. 3A through 3D illustrate an example embodiment of the motor 210. FIGS. 3A and 3B illustrate two side views of the motor 210. FIGS. 3C and 3D illustrate two end views of the motor 210. As illustrated in FIGS. 3A through 3D, the motor 300 includes a rotating shaft 310 and a cam 320 coupled to the shaft 310 and configured to rotate about the shaft 310. In some embodiments, the motor 300 is a DC motor having an operating voltage ranging between 6 and 12 volts. In some embodiments, a no-load speed of the motor is about 1000 to 1500 rpm, a maximum no-load current is about 0.3 amps, a rated-load current is about 1.1 amp, and operating temperature is between −30 to +85 Celsius degrees.

Figure 4:
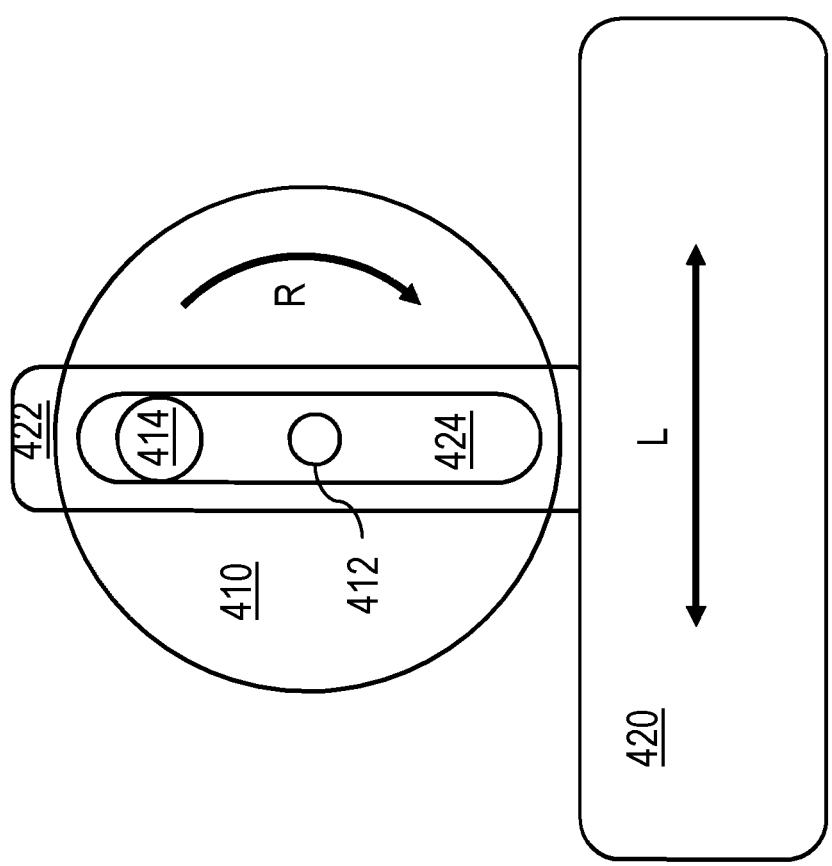
FIG. 4 illustrates an example converter configured to convert rotational motion of a motor shaft to a reciprocating linear motion.

The rotational motion of the shaft 310 and cam 320 needs to be converted into reciprocating linear motion to cause the windshield wiper blades to reciprocate linearly. Many different embodiments may be implemented in the converter 220 to convert the rotational motion to the linear reciprocal motion. FIG. 4 illustrates an example embodiment of a converter 420 for converting the rotational motion of the motor 210 in direction R to linear reciprocal motion in direction L. FIG. 4 illustrates a cross-sectional view of a motor 410, which corresponds to the motor 210 of FIG. 2A. The motor 410 is configured to drive a shaft 412 to rotate in direction R. A cam 414 is coupled to the shaft 412 to rotate about the shaft 412 in direction R. The converter 420 has a tab 422 protruding in a first direction. The tab 422 has an elongated slot 424 that has a long side that is at least as long as a diameter of a rotational path of the cam. The width of the slot 424 is configured to fit to the width of the cam 414, such that the slot 424 can receive the cam 414 and allow the cam 414 to slide along the long side of the slot 424. In particular, when the cam 414 rotates in the direction R, the cam 414 slides along the slot 424 in a first direction (i.e., the direction along the long side of the slot 424), and at the same time to cause the tab 422 to reciprocate in a second direction (i.e., direction L) that intersects the first direction. The converted reciprocate linear motion of the converter 420 is then passed onto the windshield wiper blade attached onto the converter 420 of a Power Head assembly, causing the windshield wiper blade to reciprocate linearly along the blade.

Figure 5A:
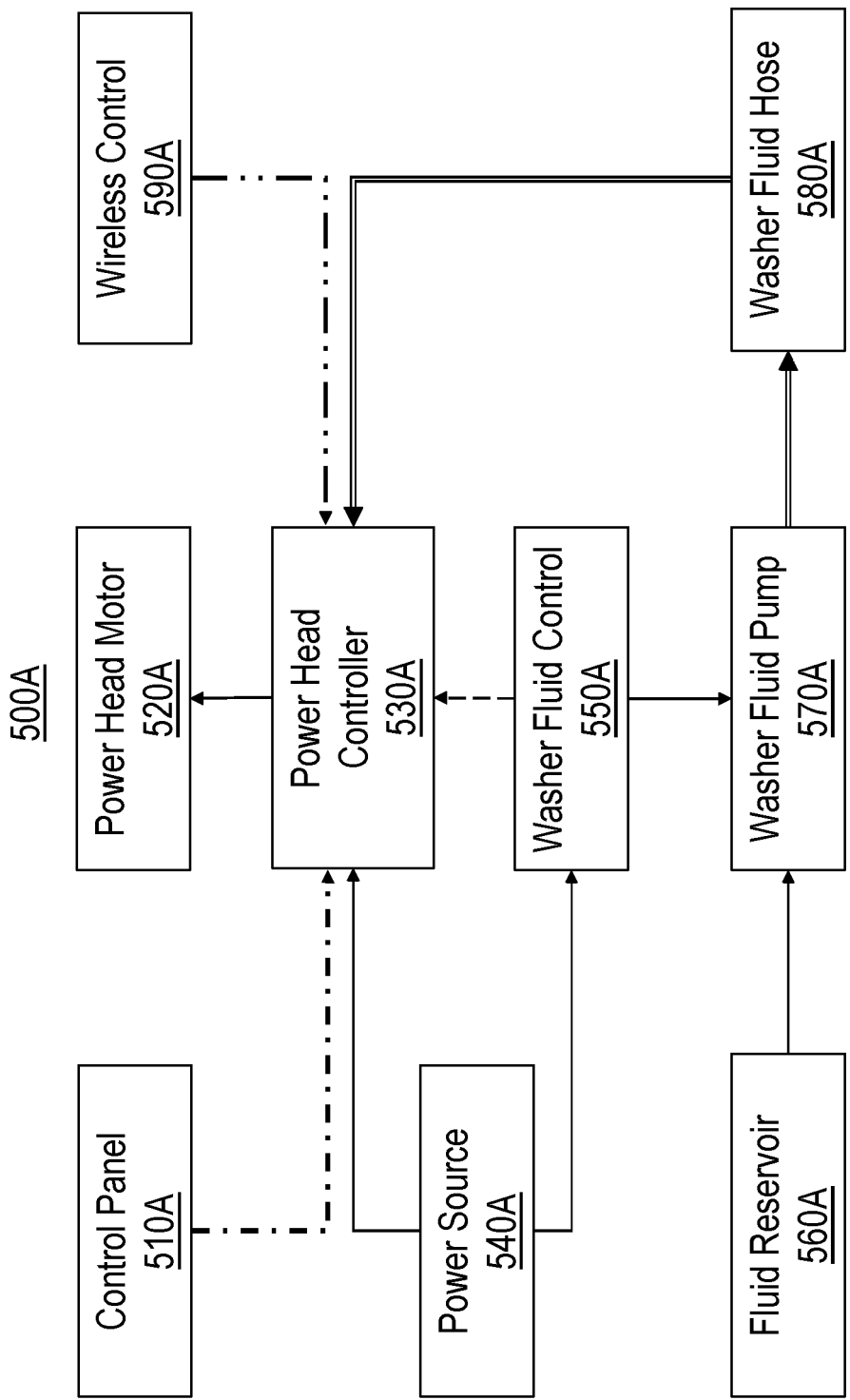
FIG. 5A illustrates an example relationship among a Power Head controller, a Power Head motor, and other parts of a vehicle.

FIG. 5A illustrates an example relationship 500A among the Power Head motor 520A, Power Head controller 530A, and other parts of a vehicle. As illustrated in FIG. 5A, the Power Head controller 530A is configured to receive power from a power source 540A of the vehicle. The Power Head controller 530A is also configured to control and transmit the received power to the Power Head motor 520A. In some embodiments, the Power Head controller 530A has a control panel 510A that allows a user to interact with the Power Head controller 530A. In some embodiments, the Power Head controller 530A is configured to receive a user input from a wireless control 590A. In some embodiments, the wireless control 590A may be a remote control. In some embodiments, the wireless control 590A may use a Bluetooth interface to allow a user to control the Power Head motor via a mobile device 590A. In such a case, the mobile device 590A may need to install a particular mobile application that allows the mobile device to communicate with the Power Head controller 530A via BLE beacon signals.

In yet some other embodiments, the Power Head controller 530A is connected to a washer fluid control 550A. The washer fluid control 550A is configured to control a washer fluid pump 570A that is configured to pump washer fluid from the fluid reservoir 560A to the windshield of the vehicle via a washer fluid hose 580A. In some embodiments, in response to activating the washer fluid pump 570A, the Power Head controller 530A is configured to transmit power to the Power Head motor 520A to activate the motor 520A. In some embodiments, the Power Head controller 530A is connected to a washer fluid hose 580A coupled to the washer fluid pump 570A. When the washer fluid pump 570A is activated, the pressure of the washer fluid in the washer fluid hose 580A increases, which then triggers the Power Head controller 530A to transmit power to the Power Head motor 520A.

The different arrows drawn in different patterns represent different communication paths that may be used by the Power Head controller 530A to control the Power Head motor 520A. Each of the communication paths is likely sufficient to allow the Power Head controller 530A to control the Power Head motor 520A. Thus, any number of the communication paths may be implemented at the Power Head controller 530A. For example, when the washer fluid is used by the Power Head controller 530A, the wireless control 590A may not be used. As another example, when the control panel 510A is coupled to the Power Head controller 530A, the washer fluid may not be used.

Figure 5B:
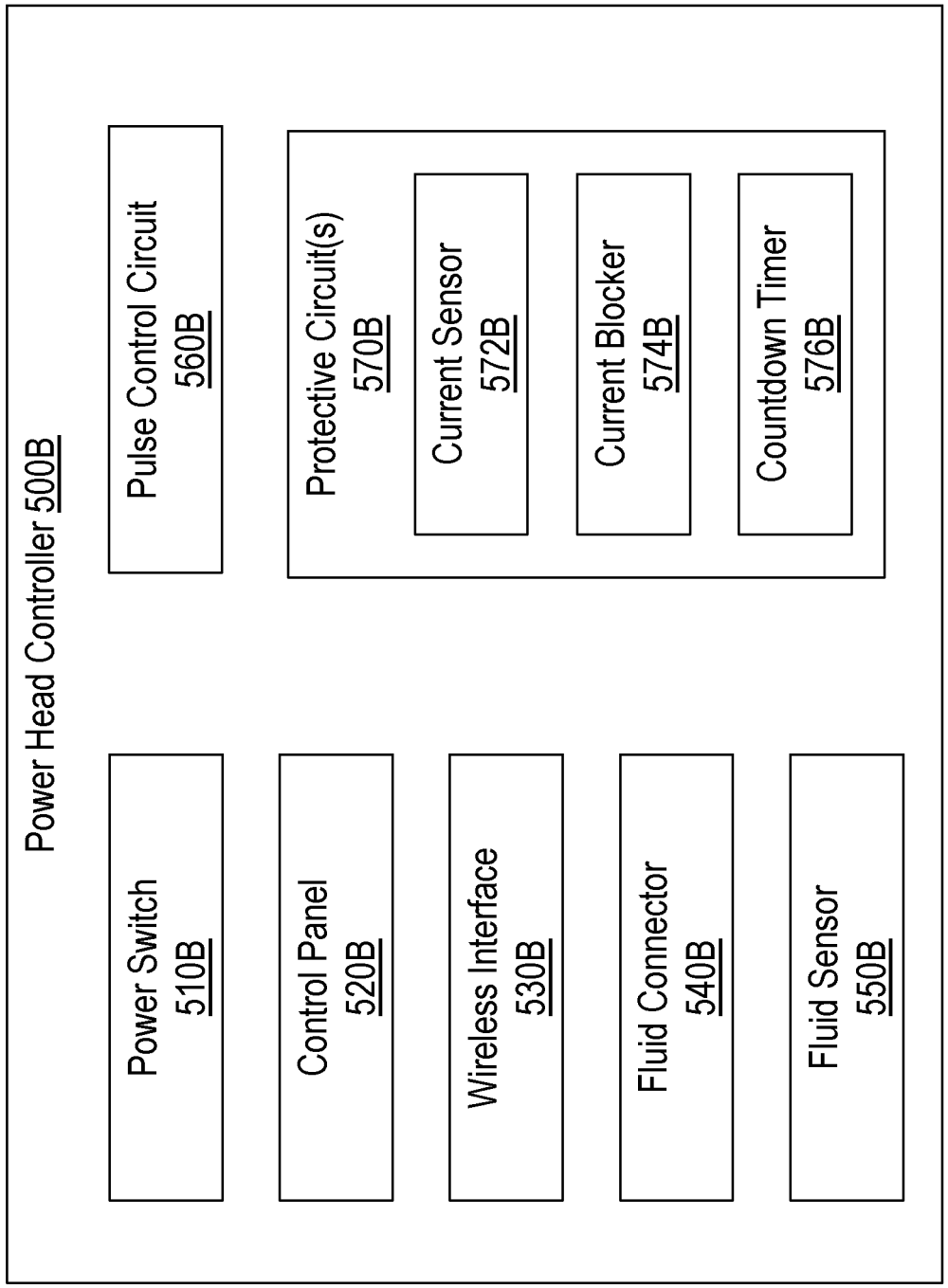
FIG. 5B illustrates an example architecture of a Power Head controller.

FIG. 5B illustrates an example architecture of the Power Head controller 500B, which corresponds to the Power Head controller 530A of FIG. 5A. In some embodiments, the Power Head controller 500B includes a power switch 510B that allows a user to manually turn on or off the Power Head control. In some embodiments, the Power Head controller 500B also includes a pulse control circuit 560B that is configured to generate a pulse control signal that has one or more predetermined patterns. The pulse control signal causes the power of the motor 520A to be turned on and off at the one or more predetermined patterns.

In some embodiments, the Power Head controller 500B also includes a control panel 520B that allows a user to select one of the one or more predetermined patterns. When the one of the one or more predetermined patterns is selected, the pulse control circuit 560B is configured to generate a control signal based on the selected pattern, causing the power of the motor 520A to be turned on and off based on the selected pattern. In some embodiments, the Power Head controller 500B may also include a wireless interface 530B configured to receive a wireless control signal. For example, a user may use a remote control 510A to select one of the one or more predetermined patterns. The remote control 510A is configured to convert the user input into a wireless signal, and transmit the wireless signal to the wireless interface 530B.

In some embodiments, the Power Head controller 500B may also include a fluid connector 540B configured to be connected to a washer fluid hose 580A. The Power Head controller 500B may also include a fluid sensor 550B configured to detect a fluid pressure in the washer fluid hose 580A. When the washer fluid pump 570A is activated, the fluid pressure in the washer fluid hose 580A increases, and when the washer fluid pump 570A is deactivated, the pressure in the washer fluid hose 580A decreases. In some embodiments, in response to an increase of the fluid pressure (or when the fluid pressure is greater than a predetermined threshold), the Power Head controller 500B activates the motor 520A; and in response to a decrease of the fluid pressure (or when the fluid pressure is lower than the predetermined threshold), the Power Head controller 500B deactivates the motor 520A.

In some embodiments, the Power Head controller 500B also includes a protective circuit 570B to prevent the motor from running in overload conditions. In some embodiments, the protective circuit 570B includes a current sensor 572B and a current blocker 574B. The current sensor 572B is configured to detect a current flowing through the motor 520A. When the current flowing through the motor 520A is greater than a threshold, the circuit blocker 574B blocks the current flowing through the motor 520A for at least a predetermined period, i.e., cut off the power supplied to the motor 520A. In some embodiments, the protective circuit 570B also includes a countdown timer 576B for timing the predetermined period. When the power is cut off due to the detected high current, the countdown timer 576B starts counting down from a predetermined number at a predetermined time interval. When the countdown timer 576B reaches zero count, the Power Head controller 500B reactivates the motor 520A. Once the motor 520A is activated, the current sensor 572B redetects the current flowing through the motor 520A. If the current flowing through the motor 520A is still higher or becomes higher than the threshold again, the current blocker 574B cut off the power supply to the motor 520A again. This process repeats until the Power Head controller 500B is turned off or the vehicle is turned off.

In some embodiments, a single Power Head controller 500B is configured to control two motors independently. In some embodiments, the Power Head controller 500B may include two protective circuits, one of which is configured to protect the first Power Head, and the other one of which is configured to protect the second Power Head. As such, when one of the Power Heads is shut down, the other one may continue to run, and vise versa.

The Power Head controller 500B is merely an example embodiment. Different embodiments may be implemented, and it is not necessary for a Power Head controller to include all the components 510B through 570B illustrated in FIG. 5B. For example, when the Power Head controller 500B has a comprehensive control panel, there is no need to use the fluid connector 540B or fluid sensor 550B. As another example, when the Power Head controller 500B uses the fluid connector 540B and fluid sensor 550B to control the power supplied to the motor of a Power Head, a simple control panel may be implemented, and/or a wireless interface 530B or power switch 510B may be omitted.

Figure 6A:
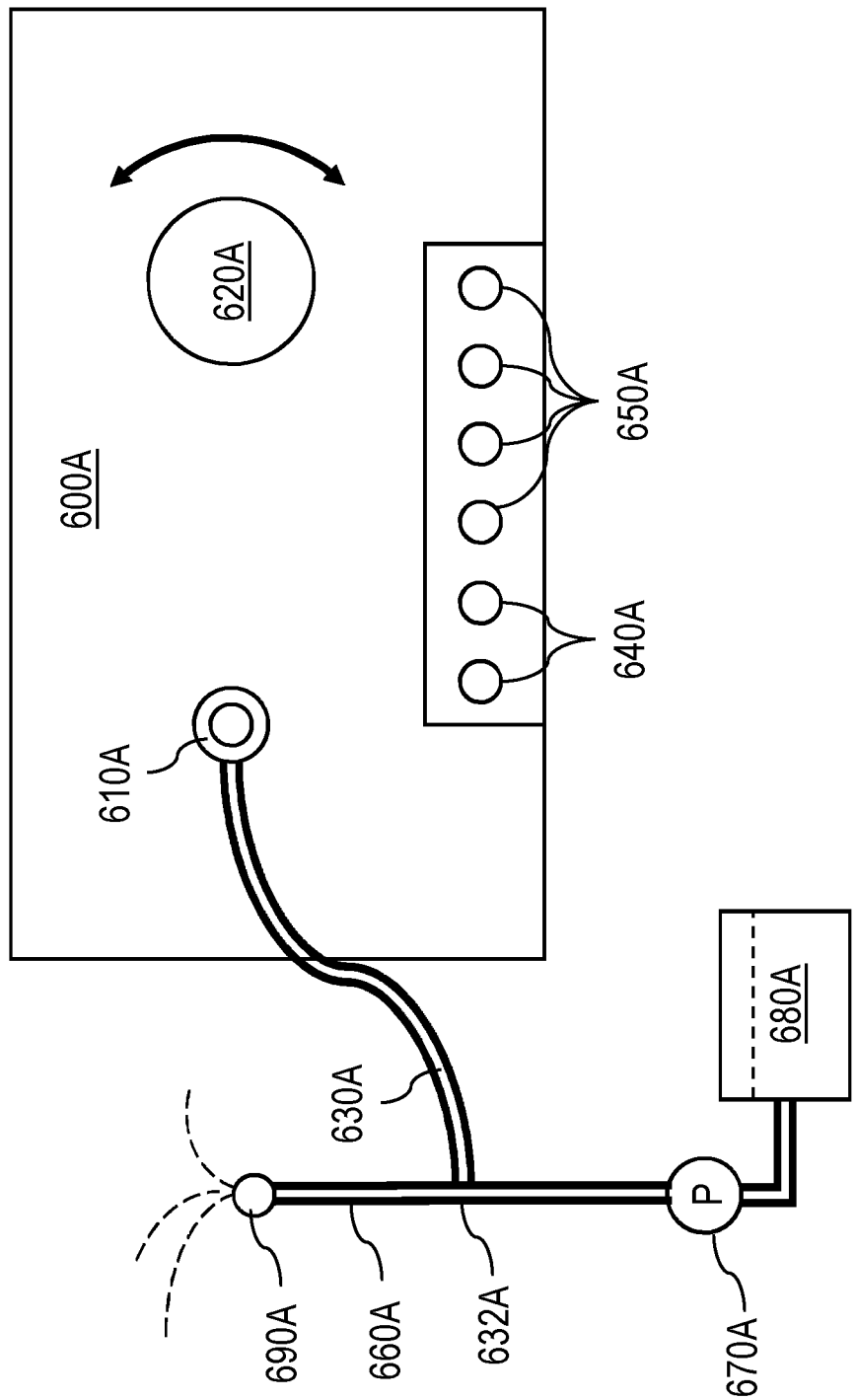
FIG. 6A illustrates an example control panel configured to control a motor of Power Head via washer fluid.
Figure 6B:
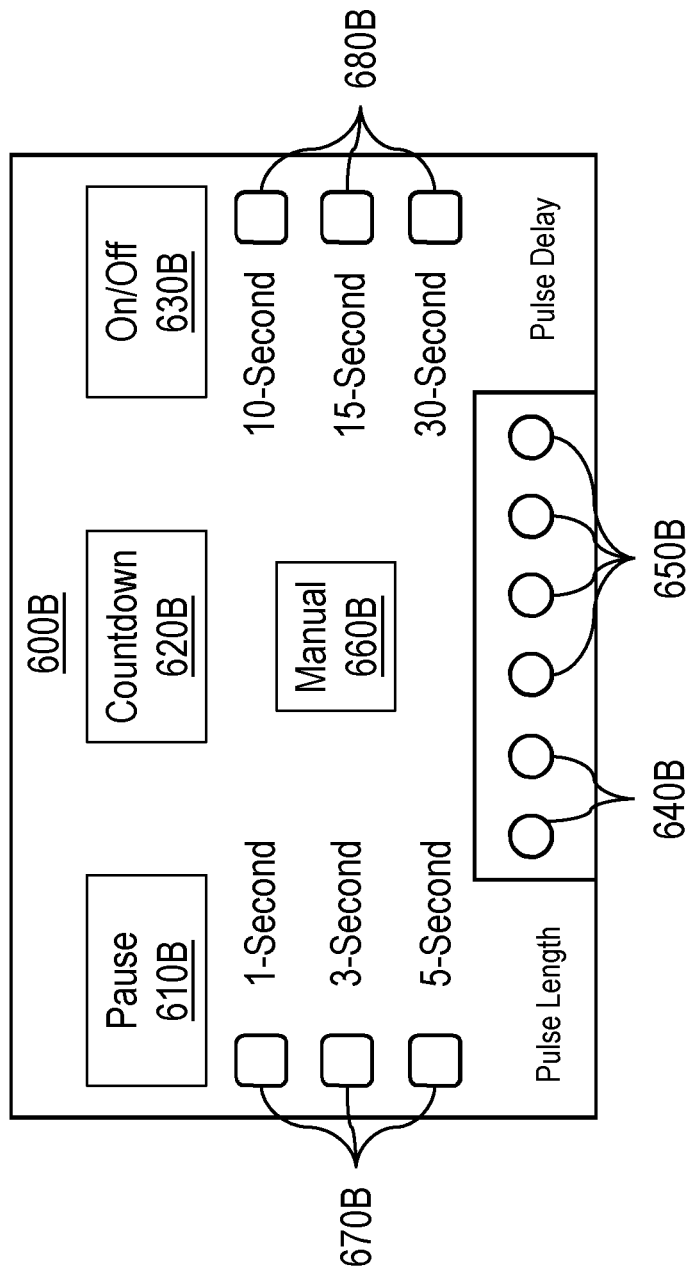
FIG. 6B illustrates an example control panel configured to allow users to adjust pulse control signals and protective circuit.

FIGS. 6A and 6B illustrate two example control panels 600A and 600B of the Power Head, which corresponds to the control panel 520B of FIG. 5B. FIG. 6A illustrates a control panel 600A that includes a pair of input power lead connectors 640A, and two pairs of output power lead connectors 650A. The input power lead connectors 640A is configured to receive power from the electrical system of a vehicle (e.g., battery of the vehicle). Each of the two pairs of output power lead connectors 650A are configured to transmit power to a Power Head. Thus, the two pairs of output power lead connectors 650A can simultaneously transmit power to two Power Heads (e.g., one for each windshield wiper blade).

The control panel 600A includes a fluid connector 610A and a pulse control 620A. The fluid connector 610A is configured to connect to a washer fluid hose 630A, which is directly or indirectly coupled to the washer fluid pump 570A and/or a washer fluid sprayer 690A. The washer fluid hose 630A may be connected to another washer fluid hose 660A via a connector 632A (e.g., a T connector). The other washer fluid hose 660A may be directly or indirectly coupled to the pump 670A and/or the washer fluid sprayer 690A. The pump 670A (corresponding to the pump 570A of FIG. 5A) is configured to pump fluid from a fluid reservoir 680A (corresponding to the fluid reservoir 560A of FIG. 5A) to a windshield fluid sprayer 690A.

A fluid sensor is coupled to the fluid connector 610A configured to detect the fluid pressure in the washer fluid hose 630A. When the washer fluid pump 570A is activated, the fluid pressure in the washer fluid hose 630A increases, which triggers the controller inside (or coupled to) the control panel 600A to provide power to the Power Head(s). When the washer fluid pump 570A is deactivated, the fluid pressure in the washer fluid hose 630A decreases, which triggers cutting off the power to the Power Head(s).

The pulse control 620A is configured to rotate to adjust a frequency of the pulse control signal. For example, in some embodiments, when the pulse control 620A is rotated in the clockwise direction, the frequency of the pulse increases; and when the pulse control 620A is rotated in the counter-clockwise direction, the pattern of the pulse decreases.

FIG. 6B illustrates another example embodiment of a control panel 600B. Similar to the control panel 600A, the control panel 600B also has a pair of input lead connectors 640B, and two pairs of output lead connectors 650B. The pair of input lead connectors 640B is configured to receive power from the electrical system of a vehicle, and each of the two pairs of output lead connectors 650B is configured to transmit power to a Power Head assembly. The control panel 600B includes an on/off switch 630B configured to allow a user to turn the control panel on or off. The control panel 600B also includes a pause button 610B configured to allow a user to temporarily pause the motor temporarily.

The control panel may also include a manual button 660B configured to allow user to program the pulse control signal. On the left side of the manual button 660B, there is a list of buttons 670B, indicating different pulse lengths. On the right side of the manual button 660B, there is another list of buttons 680B, indicating different pause delays. In some embodiments, a user can use the manual button 660B in combination with the buttons 670B and 680B to adjust the cycle of the pulse control signals. For example, when the user selects the 1-second pulse length and the 10-second pulse delay, the motor will be turned on for 1 second and turned off for 10 seconds. As another example, when the user selects the 5-second pulse length and the 15-second pulse delay, the motor will be turned on for 5 seconds and turned off for 15 seconds. Users can select different pulse lengths and pulse delays based on their needs or weather conditions. For example, when a driver is driving through heavy snow, the driver may select the 5-second pulse length and 10-second pulse delay to maximize the power of the motor.

Referring back to FIG. 5B, the controller 500B may also include a protective circuit 570B that prevents the motor from running in overload conditions. The protective circuit 570B may include a current sensor 572B, a current blocker 574B, and a countdown timer 576B. When the current flowing through the motor is greater than a predetermined threshold, the countdown timer 576B starts to count from a predetermined number. In such embodiments, a user may be allowed to set the countdown time of the countdown timer 576B, which in turn adjusts the period of time the motor is shut off. As illustrated in FIG. 6B, there is a countdown button 620B above the manual button 660B, which is configured to allow users to set the countdown time.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7A:
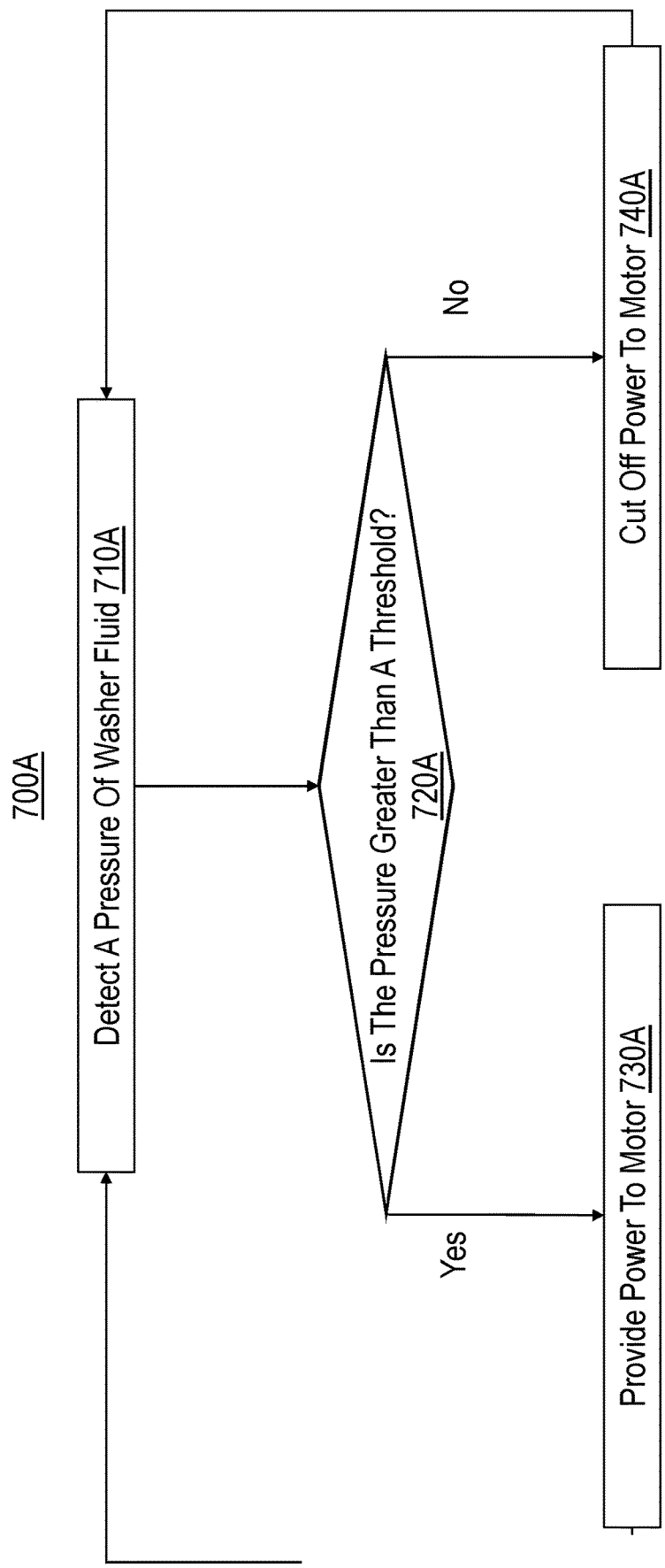
FIG. 7A illustrates a flowchart of an example method for controlling a motor of Power Head via washer fluid.

FIG. 7A illustrates a flowchart of an example method 700A for controlling a motor of a Power Head assembly by washer fluid, which may be implemented at the control panel 600A of FIG. 6. The method 700A includes detecting a pressure of washer fluid 710A and determining whether the pressure of the washer fluid is greater than a threshold 720A. When the pressure of the washer fluid is greater than the threshold, power is provided to the motor of the Power Head assembly 730A. On the other hand, when the pressure of the washer fluid is not greater than the threshold, power is cut off from the motor of the Power Head assembly 740A.

Figure 7B:
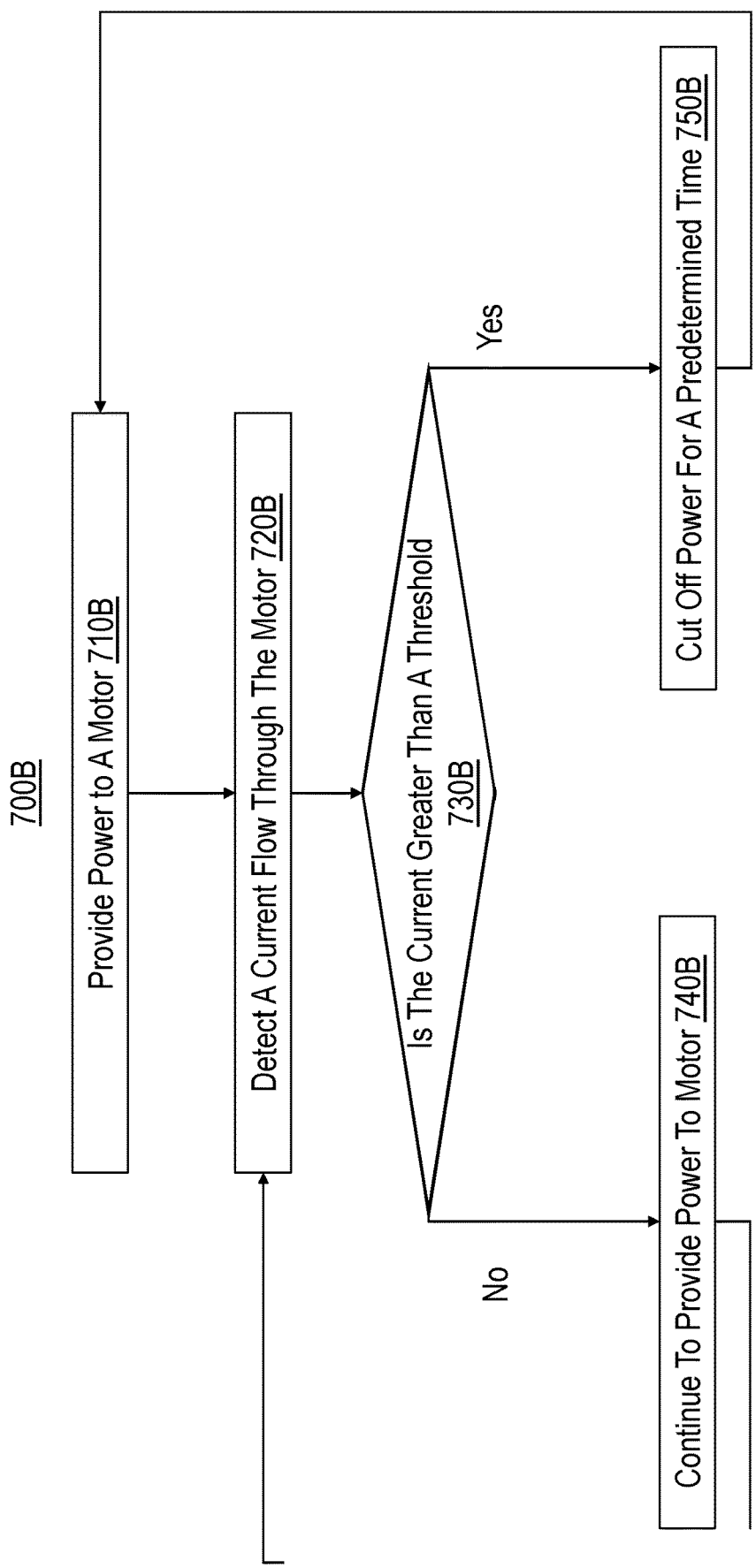
FIG. 7B illustrates a flowchart of an example method for preventing a motor of Power Head from running in overload conditions.

FIG. 7B illustrates a flowchart of an example method 700B for protecting a motor of a Power Head assembly using a protective circuit, which may be implemented at the control panel 600B of FIG. 6B. The method 700B includes activating the motor of the Power Head assembly 710B. The method 700B also includes detecting a current flowing through the motor 720B and determining whether the current is greater than a threshold 730B. When the current is greater than the threshold, shut down the power for a predetermined time 750B. On the other hand, when the current is not greater than the threshold, continue to provide power to the motor 740B.

After the predetermined time of shutting down due to the excessive current, the motor is reactivated 710B, and the current flowing through the motor 720B is redetected. If the current is greater than the threshold 730B, the power is shut down again 750B; and if the current is not greater than the threshold 730B, the power is continued to be supplied to the motor 740B. This process repeats until the vehicle is turned off, or the user manually shuts down the Power Head controller.

Finally, because the principles described herein may be performed in the context of a computing system (for example, the control panel 600A or 600B may include a computing system, and in some embodiments, the control panel 600A or 600B may be configured to interface with a computing system wirelessly) some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
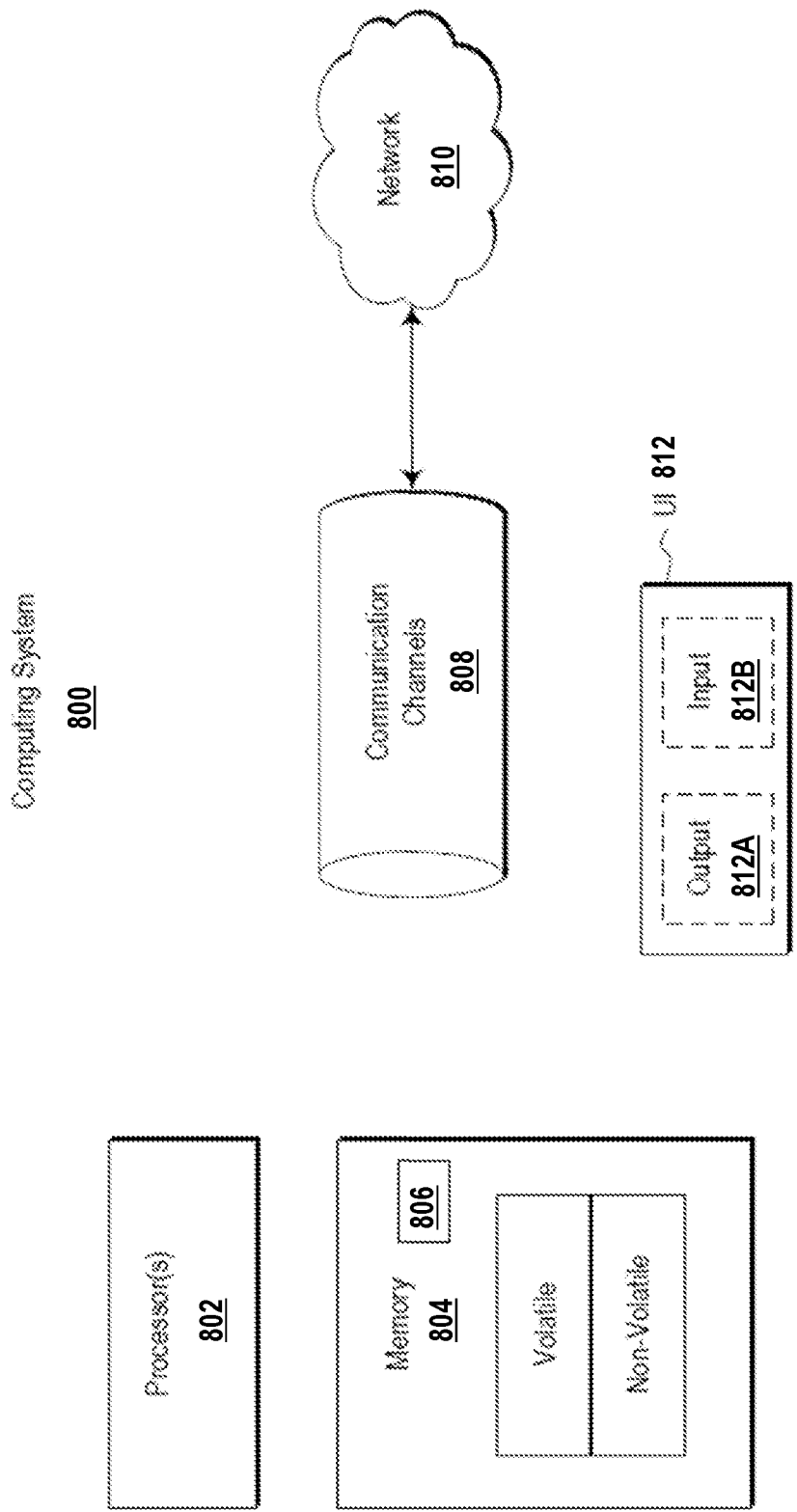
FIG. 8 illustrates an example computing system in which some of the principles described herein may be employed.

As illustrated in FIG. 8, in its most basic configuration, a computing system 800 typically includes at least one hardware processing unit 802 and memory 804. The processing unit 802 may include a general-purpose processor and may also include a field-programmable gate array (FPGA), an application-specific integrated circuit (ASIC), or any other specialized circuit. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 also has thereon multiple structures often referred to as an "executable component". For instance, memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms and so forth. Examples of input mechanisms 812B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 800 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 802 and memory 804, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A Power Head assembly configured to cause a windshield wiper blade of a vehicle to reciprocate linearly along the windshield wiper blade for removing ice or debris from a windshield of the vehicle, comprising:
   a motor having a shaft configured to rotate when the motor is activated;
   a converter coupled to the shaft of the motor and configured to convert rotational motion of the shaft to reciprocating linear motion;
   a weatherproof housing configured to house the motor and an inner portion of the converter;
   a receptacle configured to receive a windshield arm of the vehicle;
   a fastener configured to attach an outer portion of the converter directly or indirectly to the windshield wiper blade, causing the windshield wiper blade to reciprocate in a direction that is parallel to the windshield wiper blade when the motor is activated; and
   a controller configured to control the motor, the controller comprising:
      one or more input power lead connectors configured to connect to an electrical system of the vehicle for receiving power from the electrical system of the vehicle;
      one or more output power lead connectors configured to connect to the motor to supply the power received from the electrical system of the vehicle to the motor;
      a control circuit configured to generate a control signal for controlling the power supplied to the motor;

a protective circuit, comprising:
  a current sensor configured to detect a current flowing through the motor, wherein when the current flowing through the motor is greater than a threshold, the controller cuts off the power of the motor for at least a predetermined period; and
  a current blocker configured to cut off the power of the motor;
a fluid connector configured to connect to washer fluid from a fluid hose coupled to a windshield fluid pump of the vehicle; and
a fluid sensor configured to detect a pressure of the washer fluid, wherein:
  when the windshield fluid pump is activated, the fluid sensor detects a pressure increase, causing the controller to activate the motor, and
  when the windshield fluid pump is deactivated, the fluid sensor detects a pressure drop, causing the controller to deactivate the motor.

2. The Power Head assembly of claim 1, wherein the controller comprises an interface configured to receive a user input to activate or deactivate the control circuit.

3. The Power Head assembly of claim 2, wherein the interface includes a wireless interface configured to receive wireless signals of user input.

4. The Power Head assembly of claim 3, wherein the controller further includes a remote control configured to:
  receive a user input;
  convert the user input into a wireless signal; and
  transmit the wireless signal to the wireless interface.

5. The Power Head assembly of claim 3, wherein the wireless interface includes a Bluetooth interface configured to communicate with a mobile device via a mobile application.

6. The Power Head assembly of claim 1, wherein the control signal includes a pulse control signal that has one or more predetermined patterns that automatically turns the supplied power on or off at one of the one or more predetermined patterns.

7. The Power Head assembly of claim 6, wherein the controller comprises an interface that includes a selectable control for selecting one of the one or more predetermined patterns, and
  in response to detecting a user input with the selectable control for selecting one of the one or more predetermined patterns, the control circuit causes the pulse control signal to have the selected pattern that automatically turns the supplied power on or off at the selected pattern.

8. The Power Head assembly of claim 7, wherein each of the one or more predetermined patterns includes:
  a pulse length, indicating a length of period during which the power supplied to the motor is turned on; and
  a pulse delay, indicating a length of period during which the power supplied to the motor is turned off.

9. The Power Head assembly of claim 8, wherein the interface is configured to receive a first user input of selecting one of a plurality of pulse lengths and a second user input of selecting one of a plurality of pulse delays.

10. The Power Head assembly of claim 1, wherein the protective circuit further comprises a countdown timer;
  the predetermined period is measured by the countdown timer counting down from a predetermined number at a predetermined time interval; and
  when the countdown timer reaches zero count, the controller reconnects the power to the motor.

11. The Power Head assembly of claim 1, wherein:
the motor is a first motor;
the shaft is a first shaft;
the converter is a first converter;
the receptacle is a first receptacle;
the windshield arm is a first windshield arm;
the fastener is a first fastener;
the windshield wiper blade is a first windshield wiper blade;
the one or more output power lead connectors are one or more first output power lead connectors; and
the Power Head assembly further comprises:
a second motor having a second shaft configured to rotate when the second motor is activated;
a second converter coupled to the second shaft of the second motor and configured to convert rotational motion of the second shaft to reciprocating linear motion;
a second receptacle configured to receive a second windshield arm of the vehicle; and
a second fastener coupled to the second converter configured to fasten the second converter onto a second windshield wiper blade directly or indirectly, causing the second windshield wiper blade to reciprocate along the second windshield wiper blade when the motor is activated;
the controller further comprises one or more second output power lead connectors configured to connect to the second motor to supply power received from the electrical system of the vehicle to the second motor; and
the control circuit further configured to use the control signal to control power supplied to the second motor.

12. The Power Head assembly of claim 11, wherein:
the controller further comprises:
a first protective circuit comprising a first current sensor configured to detect a current flowing through the first motor; and
a second protective circuit comprising a second current sensor configured to detect a current flowing through the second motor; and
when the current flowing through the first motor or the second motor is greater than a threshold, the controller shuts down the power supplied to the corresponding motor for a predetermined period.

13. The Power Head assembly of claim 12, wherein when the current flowing through the first motor is greater than the threshold, and the current flowing through the second motor is not greater than the threshold, the controller shuts down the power of the first motor for at least a predetermined period, and continues supplying the power to the second motor while the first motor is shut down.

14. A system comprising a Power Head assembly and Power Arm assembly, the system configured to cause a windshield wiper blade of a vehicle to reciprocate linearly along the windshield wiper blade for removing ice or debris from a windshield of the vehicle,
  the Power Head assembly comprising:
    a first motor having a shaft configured to rotate when the first motor is activated;
    a first converter coupled to the shaft of the first motor and configured to convert rotational motion of the shaft to reciprocating linear motion;
    a weatherproof housing configured to house the first motor and an inner portion of the first converter;
    a receptacle configured to receive a first end of a windshield wiper arm of the vehicle;

a fastener configured to attach an outer portion of the first converter directly or indirectly to the windshield wiper blade, causing the windshield wiper blade to reciprocate in a direction that is parallel to the windshield wiper blade when the first motor is activated; and a controller configured to control the first motor, the controller comprising:
- one or more input power lead connectors configured to connect to an electrical system of the vehicle for receiving power from the electrical system of the vehicle;
- one or more output power lead connectors configured to connect to the motor to supply the power received from the electrical system of the vehicle to the motor;
- a control circuit configured to generate a control signal for controlling the power supplied to the first motor; and
- a protective circuit, comprising:
  - a current sensor configured to detect a current flowing through the first motor, wherein when the current flowing through the first motor is greater than a threshold, the controller cuts off the power of the first motor for at least a predetermined period; and
  - a current blocker configured to cut off the power of the first motor;

the Power Arm assembly comprising:
- a motorized pivot configured to cause the windshield wiper blade to sweep in an arcing motion across the surface of the windshield about the motorized pivot;
- a power wiper arm, the power wiper arm comprising:
  - a drive motor configured to cause the power wiper arm to reciprocate linearly along the power wiper arm, the drive motor comprising:
    - a second motor having a shaft configured to rotate when the second motor is activated; and
    - a second converter coupled to the shaft of the second motor and configured to convert rotational motion of the shaft of the second motor to reciprocating linear motion;
- a wiper arm base configured to couple the power wiper arm to the motorized pivot, the wiper arm base comprising:
  - a switching mechanism configured to switch the power wiper arm between an operating position and an off position, wherein
    - when the power wiper arm is in the operating position, the windshield wiper blade touches the windshield and applies pressure onto the windshield, and
    - when the power wiper arm is in the off position, the windshield wiper blade is lifted away from the windshield.

* * * * *